United States Patent
Anderson

(10) Patent No.: US 6,232,691 B1
(45) Date of Patent: *May 15, 2001

(54) DC ELECTRIC STARTER-GENERATOR

(75) Inventor: Norman Helmut Anderson, Bolton (CA)

(73) Assignee: Dellcom Aviation Inc., Concord (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,574

(22) Filed: Sep. 17, 1998

(51) Int. Cl.$^7$ .............. H02K 1/00; H02K 1/32; H02K 47/04; H02K 3/04; H02K 3/48

(52) U.S. Cl. .............. 310/179; 310/61; 310/113; 310/184; 310/198; 310/210; 310/214; 310/218; 310/269

(58) Field of Search .................. 310/261, 214, 310/61, 60 A, 65, 216, 217, 218, 185, 198, 264, 156, 64, 49 R, 179, 113, 254, 258, 259, 265, 266, 267, 268, 269, 162, 163, 166, 168, 184

(56) References Cited

U.S. PATENT DOCUMENTS

| | | | |
|---|---|---|---|
| 3,489,939 | * 1/1970 | McDougald et al. | 310/269 |
| 3,740,600 | * 6/1973 | Turley | 310/194 |
| 3,908,130 | 9/1975 | Lafuze | 290/46 |
| 3,937,974 | 2/1976 | Lafuze | 290/46 |
| 4,024,443 | 5/1977 | Schmucker et al. | 318/175 |

(List continued on next page.)

FOREIGN PATENT DOCUMENTS

| | | |
|---|---|---|
| 180 450 | 12/1906 | (DE) . |
| 0 008 250 | 2/1980 | (EP) . |
| 0 625 819 | 11/1994 | (EP) . |
| 0 756 368 | 1/1997 | (EP) . |
| 2 538 970 | 7/1984 | (FR) . |

OTHER PUBLICATIONS

Chalmers, B.J. *Electric Motor Handbook* (London: Butterworths, 1988) pp. 92–93, 300–304.
Werninck, E.H. *Electric Motor Handbook* (London: McGraw–Hill, 1978) pp. 421–426.
Duffin, D.J. *Generators and Motors and Their Applications* (New York: McGraw–Hill, 1947) pp. 137–142.
Philpott, S.F. *Fractional Horse Power Motors* (London: Chapman and Hall, 1951) pp. 217–231.

(List continued on next page.)

*Primary Examiner*—Nestor Ramirez
*Assistant Examiner*—Dang Dinh Le
(74) *Attorney, Agent, or Firm*—Bereskin & Parr

(57) ABSTRACT

The present invention provides an improved DC electric starter-generator having high starting torque, compact size and weight, increased efficiency and reliability, and being particularly suitable for a starter-generator for aircraft engines but also suitable for other applications. The DC electric starter-generator has a rotor assembly including a rotor core having a cross-sectional silhouette formed by a hub having preferably one of four and six appendages extending radially from the hub. Each appendage includes a flanged formation having an outer edge which is formed to obtain a desired commutation current wave form. The DC electric starter-generator further includes a stator assembly with a plurality of stator slots, each of which include at least two phase windings which are wound in a direction opposite each other to substantially reduce the effects of counter e.m.f. during operation. The DC electric starter-generator also includes a compact, circular ring shaped power module which can be positioned directly adjacent the stator assembly and within the downstream path of the cooling fan.

5 Claims, 20 Drawing Sheets

U.S. PATENT DOCUMENTS

| | | | |
|---|---|---|---|
| 4,047,081 | 9/1977 | Liska | 318/138 |
| 4,227,605 | 10/1980 | Höfling | 198/331 |
| 4,352,051 | 9/1982 | Johnson | 318/790 |
| 4,382,188 | 5/1983 | Cronin | 290/1 |
| 4,446,416 | 5/1984 | Wanlass | 318/812 |
| 4,456,830 | 6/1984 | Cronin | 290/27 |
| 4,473,752 | 9/1984 | Cronin | 290/38 |
| 4,587,450 | 5/1986 | Ozaki | 310/156 |
| 4,591,313 | 5/1986 | Miyatake et al. | 416/15 |
| 4,692,645 * | 9/1987 | Gotou | 310/184 |
| 4,720,638 | 1/1988 | Vollbrecht | 290/38 |
| 4,721,033 | 1/1988 | Hutchings et al. | 74/421 |
| 4,743,776 | 5/1988 | Baehler et al. | 290/31 |
| 4,788,465 * | 11/1988 | Hertrich | 310/269 |
| 4,843,271 * | 6/1989 | Shah | 310/214 |
| 4,855,610 | 8/1989 | Morishita et al. | 290/48 |
| 4,862,009 | 8/1989 | King | 290/22 |
| 4,895,035 | 1/1990 | Okamoto et al. | 74/7 |
| 4,899,603 | 2/1990 | Isozumi et al. | 74/6 |
| 4,954,740 * | 9/1990 | Brigham | 310/185 |
| 4,995,275 | 2/1991 | Okamoto et al. | 74/7 |
| 5,023,527 | 6/1991 | Erdman et al. | 318/254 |
| 5,055,764 | 10/1991 | Rozman et al. | 322/10 |
| 5,086,246 * | 2/1992 | Dymond et al. | 310/269 |
| 5,345,130 | 9/1994 | Kliman et al. | 310/156 |
| 5,386,184 | 1/1995 | Jones | 318/701 |
| 5,459,385 * | 10/1995 | Lipo et al. | 318/701 |
| 5,479,080 | 12/1995 | Jones | 318/701 |
| 5,581,168 | 12/1996 | Rozman | 318/723 |
| 5,594,322 | 1/1997 | Rozman | 322/10 |
| 5,739,607 | 4/1998 | Wood, III | 310/90.5 |
| 5,825,112 * | 10/1998 | Lipo et al. | 310/181 |
| 5,844,346 * | 12/1998 | Kolomeitsev et al. | 310/254 |

OTHER PUBLICATIONS

Veinott, C.G. *Fractional Horsepower Electric Motors* (New York: McGraw–Hill, 1948) pp. 415–423.

Parshall, H.F. *Armature Windings of Electric Machines* (New York: D. Van Nostrand Company, 1895) Fig. 110.

EP Patent Abstracts of Japan, Publication No. 55155527, Publication Date Mar. 12, 1980.

EP Patent Abstracts of Japan, Publication No. 58112429, Pulbication Date Apr. 07, 1993.

* cited by examiner

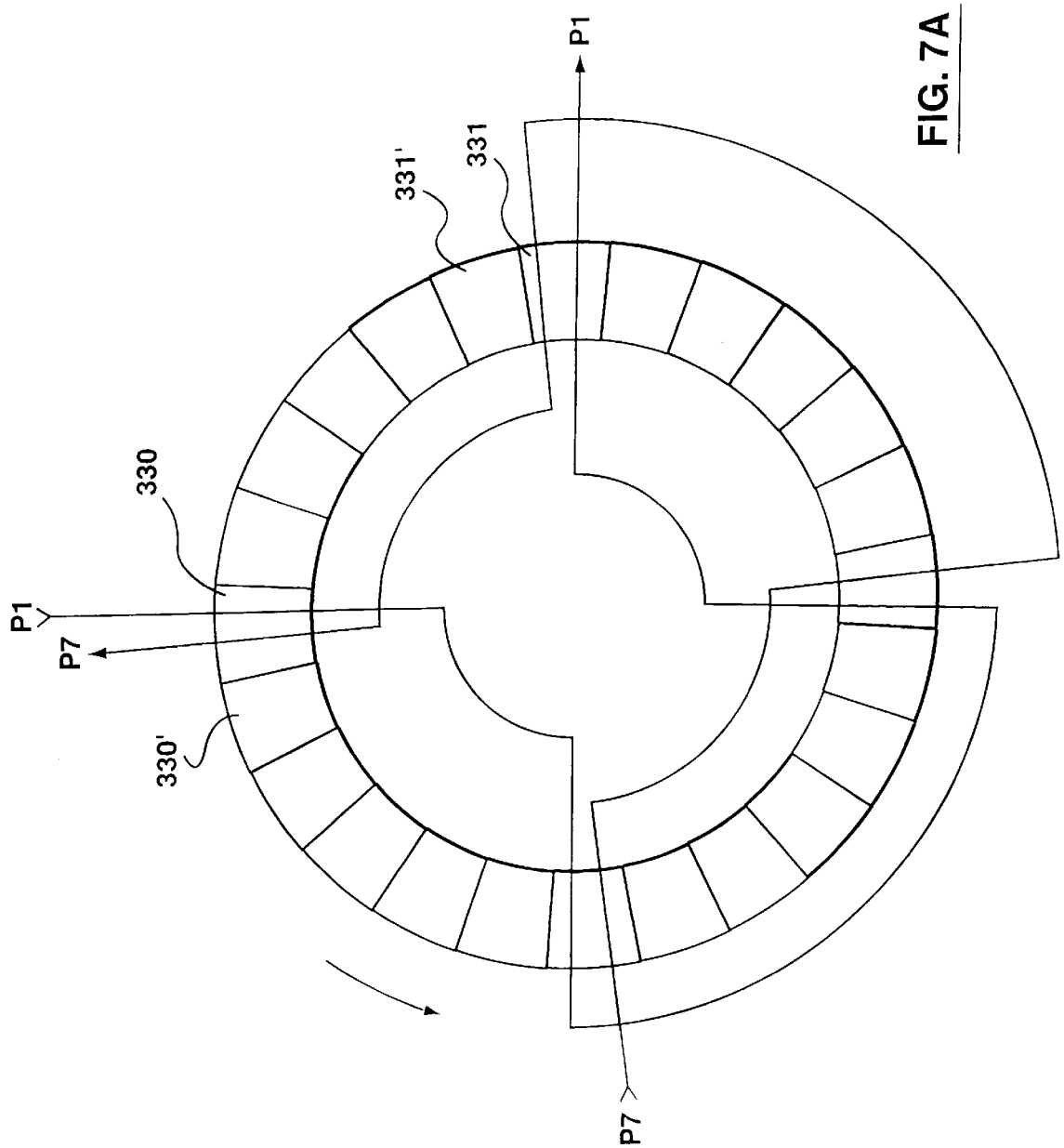

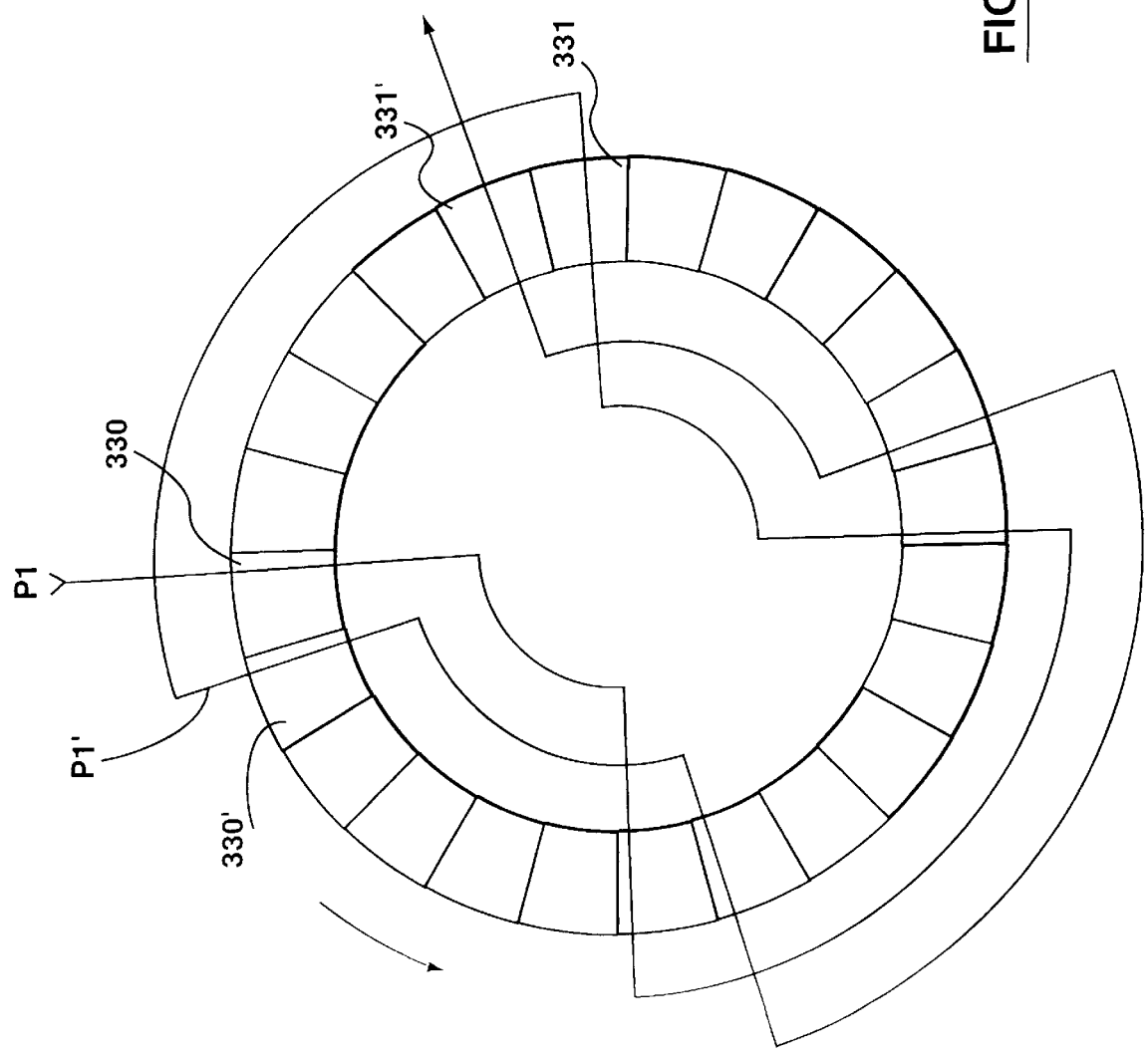

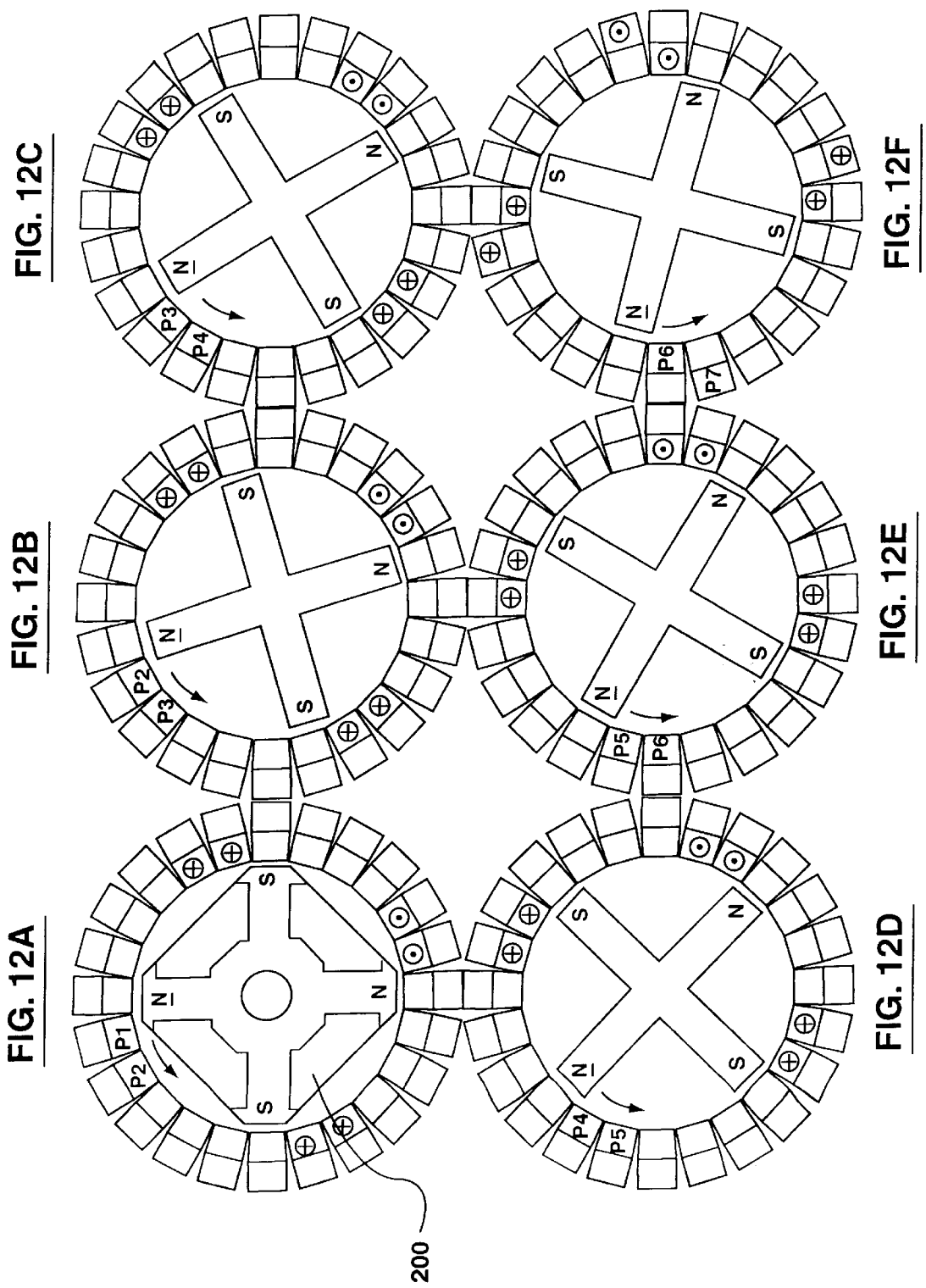

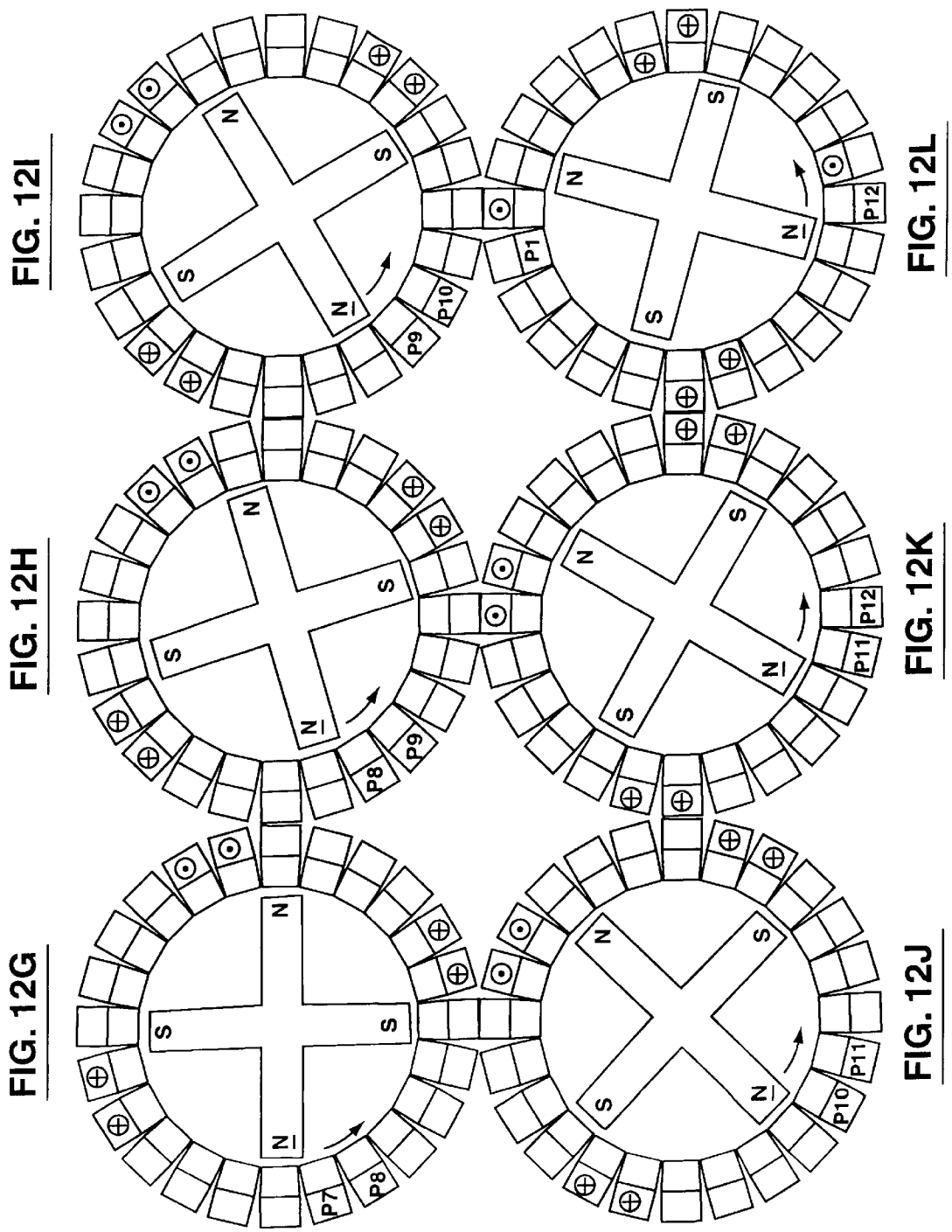

DC ELECTRIC STARTER-GENERATOR

FIELD OF THE INVENTION

This invention relates to an improved DC electric starter-generator having compact size, low weight and increased reliability, and which is capable of delivering high starting torque with good efficiency. In a preferred version, it relates to an improved DC electric starter-generator which can be used in starting the engine of aircraft, and subsequently generating electrical power for use by the aircraft.

BACKGROUND OF THE INVENTION

A DC electric starter-generator ("S/G") is typically used for bringing aircraft engines from a full-stop up to a rotational velocity sufficient to achieve engine ignition, and for subsequently generating electrical power. The S/G must be capable of producing high starting torque in order to turn an aircraft engine having substantial compression and inertial mass. In addition, the S/G must meet certain size and weight criteria in order to be acceptable for use on aircraft. While known aircraft S/G designs are capable of providing the necessary torque, they suffer from a number of significant drawbacks.

One major drawback is the collection of harmful, abrasive dust at points of rotation. Typically, known aircraft S/Gs include an armature assembly mounted on an armature shaft, the armature shaft being supported by bearings located at either side of the armature assembly. It is generally necessary to cool a S/G unit using a fan mounted to the armature shaft at one end, so that air is directed over the armature assembly and over a corresponding stator assembly whenever the S/G unit is in operation. In addition, it is common to commutate the armature windings by using commutation brushes. The commutation brushes generate dust particles which are directed downstream and which accumulate at the support bearings, causing the bearings to wear down prematurely. Typically, bearings must be replaced after every 1,000 hours of operation due to the dust collection problem. In addition, due to wear, the commutation brushes must be changed after every 400–600 hours of operation. This results in the need for frequent maintenance and service for known aircraft S/G designs.

Another major drawback of known aircraft S/G designs is their relatively low operating efficiency, typically hovering in the 70% range. Low efficiency S/Gs require higher current input, and take a longer time to achieve the necessary rotational velocity for engine ignition. This generally results in lower performance and possibly a shorter service life for the S/G and the aircraft engine, due to increased operating temperatures. A key factor which limits the performance of known S/Gs, both in terms of available starting torque and motor efficiency, is the limiting effect of counter electromotive forces (e.m.f.) produced in the armature—i.e. as the armature increases in rotational velocity and flux, the counter e.m.f. produced by the armature and acting on the stator field coils also increases, causing the current flowing in the stator field coils to be reduced, thereby decreasing the magnetic flux generated around the armature windings which produce the torque. The limiting effect of counter e.m.f. is inherent to all S/Gs, and known aircraft S/G designs have not been able to achieve efficiency much above the 70% range largely due to this problem. Other factors which decrease the efficiency of prior art aircraft S/G designs include friction introduced by commutation brushes, and high resistive copper losses in the series armature and stator windings.

Related to the problem of efficiency and service life is the issue of adequate cooling for the stator and armature assemblies and other components located within the S/G housing. In typical S/G designs, the air space between the armature and the stator is minimal. While the problem of air-cooling is minimized once the aircraft is airborne, the limited air space between armature and stator in present S/G designs limits the effectiveness of air-cooling while the aircraft is still on the ground. Consequently, a design which increases the air space and improves the airflow, while still being capable of producing an effective flux field, is desirable.

SUMMARY OF THE INVENTION

The present invention provides an improved DC S/G design having a higher starting torque, greater efficiency, and improved reliability in comparison to prior art devices. In particular, the improved S/G is designed to overcome a number of major drawbacks which are found in known aircraft S/G designs. Although a preferred embodiment particularly suited for use in an aircraft is described, it should be noted that the improvements taught by this invention are easily adaptable to S/Gs for other applications, including use as a S/G for virtually any machine which requires such a device.

In one aspect of the present invention, there is provided a DC electric starter comprising:

(i) a rotor assembly with a rotor core having a cross-sectional silhouette formed by a hub with F equally spaced apart appendages extending radially from said hub, each of said appendages comprising an arm attached to said hub and having an outer end and a flanged formation at said outer end of said arm, said flanged formation having a width contained within a sector defined by a first pair of straight lines extending from the center of the rotor assembly to each edge of said flanged formation, the angle formed by said first pair of straight lines defining a first angle between them, said first angle being between $30°\times(4/F)$ and $40°\times(4/F)$ wherein F is the number of rotor poles and the value of F is one of four and six; and (ii) a generally hollow cylindrically shaped stator assembly encircling said rotor assembly, said stator assembly having an inner surface and including a plurality of stator slots extending substantially lengthwise along said inner surface, each of said slots having at least two main stator phase winding segments located therein, said two main stator phase winding segments in each stator slot being oppositely wound;

wherein, said stator assembly has a forward direction of rotation, and there are twelve main stator phase winding segments and $6\times F$ stator slots, said twelve main phase winding segments being identifiable as main phase winding segments one through twelve, each of said main phase winding segments one through six being routed through six consecutive stator slots and in the same direction within said stator slots, each of said main phase winding segments one through six being further routed through every sixth stator slot at substantially $360°/F$ intervals from a corresponding one of said six adjacent stator slots, for a plurality of turns, each turn covering 360° in said forward direction, each of said main phase winding segments seven through twelve being routed through said six consecutive stator slots but in a direction within said stator slots opposite from main phase winding segments one through six, each of said main phase winding segments seven through twelve being further routed through every sixth stator slot at substantially $360°/F$ intervals from the corresponding one of said six consecutive stator slots, for said plurality of turns, each turn covering 360° in said forward direction, so as to form said two oppositely wound main phase winding segments in every stator slot.

In another embodiment, every $(N+1)^{th}$ turn of each of said phase winding segments is offset by one stator slot position in said forward direction, so as to form a secondary phase winding segment corresponding to each of said main phase winding segments one through twelve, the turn ratio of said secondary phase winding segments to said main phase winding segments being 1:N, where N is an integer between 3 and 7.

In another embodiment, the turn ratio of said secondary phase winding segments to said main phase winding segments is 1:5.

In yet another embodiment, the DC electric starter also operates as a generator in generator mode.

BRIEF DESCRIPTION OF THE DRAWINGS

For a better understanding of the present invention, and to show more clearly how it may be carried into effect, reference will be made by way of example to the accompanying drawings which show a preferred embodiment of the present invention.

FIG. 5b shows a six pole variant of the preferred four pole rotor design shown in FIG. 5a;

FIG. 7a is a schematic diagram illustrating the opposing paths of two main phase winding segments for a four pole rotor variant, the opposing main phase winding segments being routed through four stator slots separated by 90° intervals;

FIG. 7b is a schematic diagram illustrating the path of a main phase winding segment together with a secondary phase winding segment, the secondary phase winding segment being offset by one stator slot position in the forward direction ahead of the main phase winding segment;

FIGS. 12a–12l illustrate the commutation pattern for one commutation cycle and one half revolution of the rotor assembly for a four pole rotor variant;

DETAILED DESCRIPTION OF THE INVENTION

Figure 1:
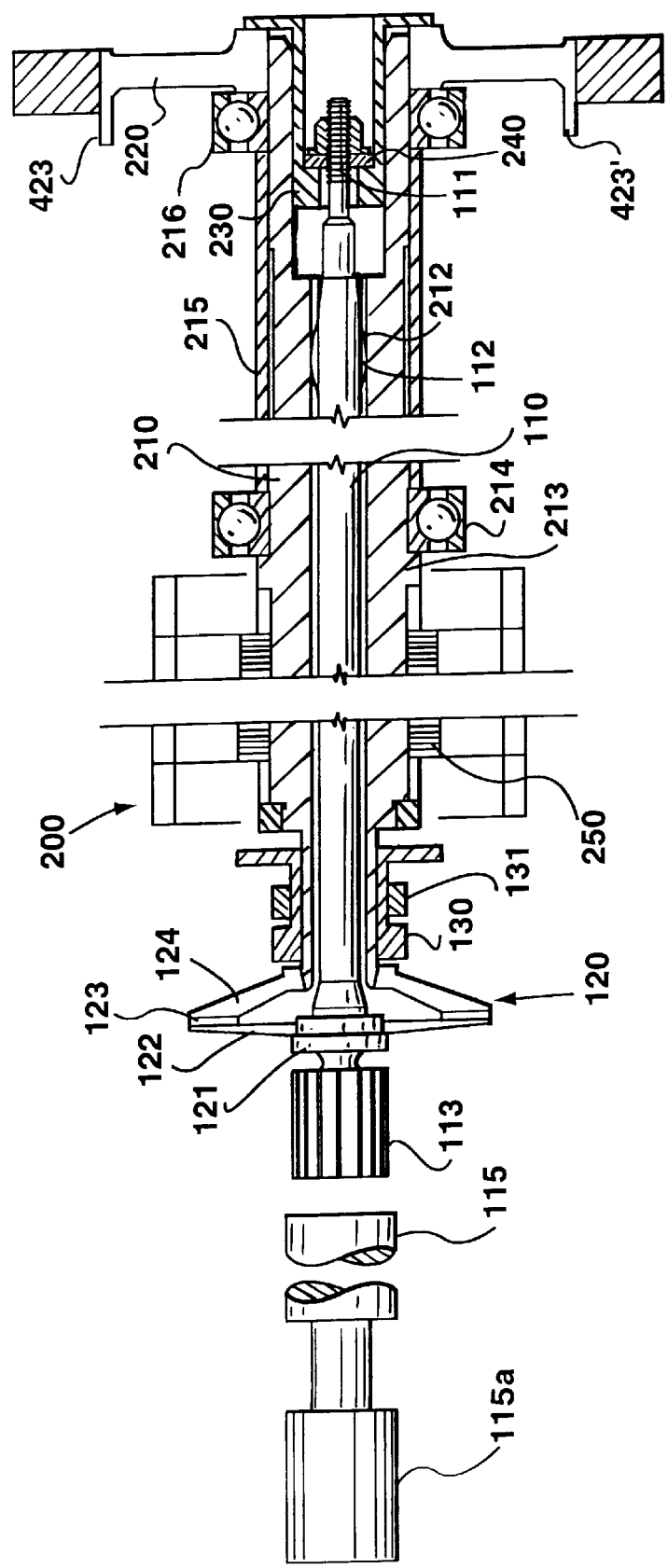
FIG. 1 shows a side cross-sectional view of a rotor assembly together with a rotor shaft, a drive shaft, and an over-hung bearing arrangement.

Referring to FIG. 1, a rotor assembly 200 is shown mounted on a rotor shaft 210. The rotor assembly 200 includes a rotor core 250 which has a key inserted into slots in the rotor shaft 210 to prevent rotation of the rotor core 250 with respect to the rotor shaft 210. The rotor shaft 210 is hollow and accepts a drive shaft 110 within its hollow core. The drive shaft 110 includes along its length 4-tooth male drive splines 112 which mate with 4-tooth female drive splines 212 located on the inner surface of the rotor shaft core. A threaded rod tip 111 is located at a first end of the drive shaft 110 and accepts a threaded fastener 240 to secure the drive shaft 110 to the rotor shaft 210 using a retention bushing 230. Mounted on the opposite end of the drive shaft 110 is an anti-torsion friction disc assembly 120. The anti-torsion friction disc assembly 120 comprises a dampener hub 121, a dampener plate 122, a friction ring 123, and a dampener back plate 124. A 16-tooth drive spline 113 is located adjacent to the anti-torsion friction disc assembly 120 and mates with a compatible 16-tooth drive spline 115 of an aircraft engine 115a. As is apparent to one skilled in the art, the anti-torsion friction disc assembly 120 is designed to prevent torsional vibration from prematurely wearing out the drive spline interface.

Still referring to FIG. 1, a first bearing 214 is shown supporting the rotor shaft 210 at an intermediate point along the length of the rotor shaft 210. A second bearing 216 is shown supporting the rotor shaft 210 at a first end of the rotor shaft 210. The first bearing 214 and second bearing 216 are separated by a bearing spacer 215. Also shown at the first end of the rotor shaft 210 is a fan 220 mounted onto rotor shaft 210 and secured by retention bushing 230. In operation the fan 220 rotates along with the rotor shaft 210 causing air to be blown downstream over the rotor assembly 200. Conventionally, the first and second bearings would be supporting the rotor shaft on either side of the rotor assembly. However, in order to avoid the problem of dust collection at the downstream bearings, as described in the background to the invention above, the rotor assembly 200 of the present invention is shown in an over-hung configuration with both first and second bearings 214, 216 towards one side, i.e. the upstream side, of the rotor assembly 200. Also shown in FIG. 1 are first and second slip rings 130, 131 located adjacent to the rotor assembly 200 and opposite first and second bearings 214, 216. During operation, slip rings 130, 131 will produce dust particles. Advantageously, the slip rings 130, 131 are located downstream from first and second bearings 214, 216, i.e. between the first bearing 214 and a second end of the rotor shaft 210, so as to avoid the problem of dust collecting at a downstream bearing. Thus the over-hung rotor assembly arrangement reduces the costs associated with frequent maintenance required to service support bearings which collect dust.

Figure 2:
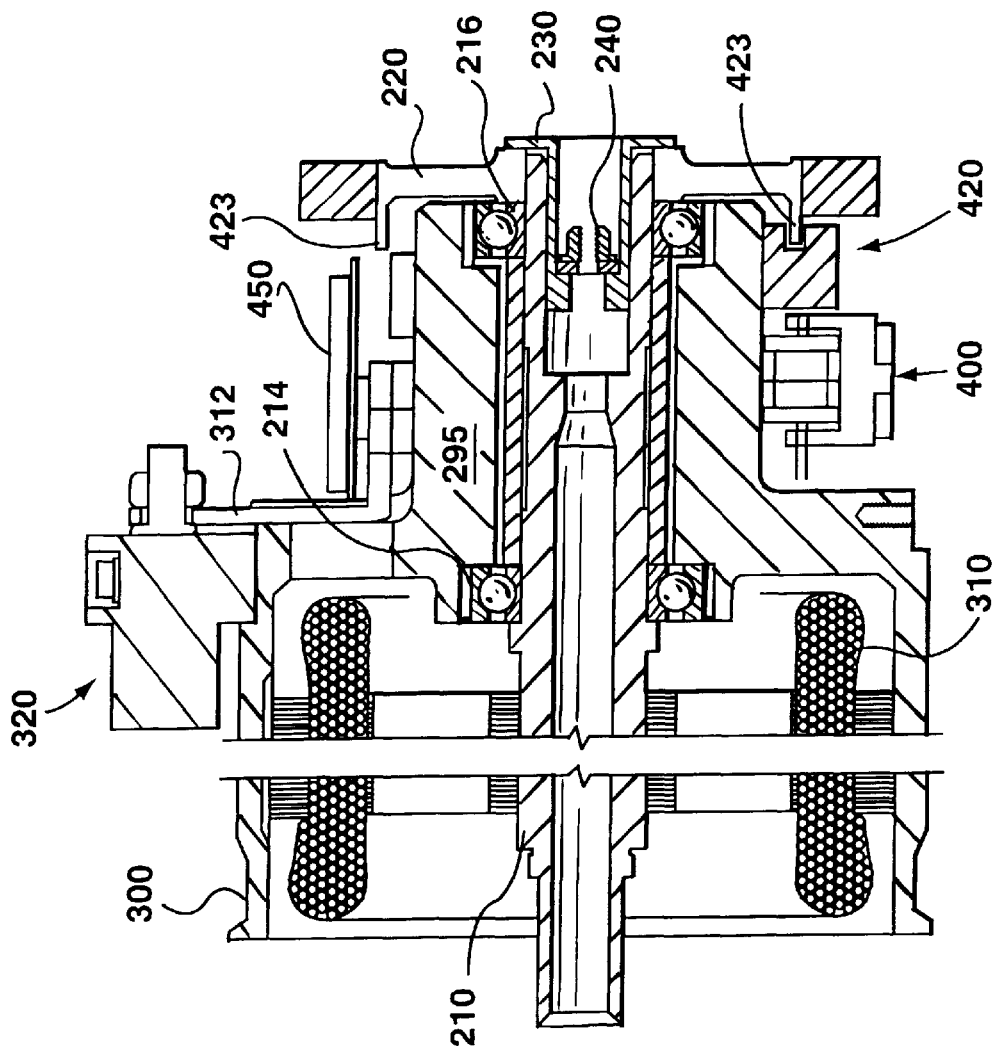
FIG. 2 shows a side cross-sectional view of a stator assembly, a stator housing, a power module assembly, a commutation logic circuit board, and a terminal block.

Now referring to FIG. 2, rotor shaft 210, fan 220, and first and second bearings 214, 216 are shown mounted inside a main housing 295. Also shown in FIG. 2 is stator housing 300 with stator core windings 310 shown in cross-section inside the stator housing 300. The rotor assembly 200, slip rings 130, 131, and drive shaft 110, shown in FIG. 1, are not shown in FIG. 2.

Still referring to FIG. 2, fan 220 includes optical interrupters 423 located on the downstream side of the fan 220. These optical interrupters 423, together with optical position sensors 420 and power module 400, perform an electronic commutation function which eliminates the requirement for having commutation brushes which wear down and produce dust. The optical interrupters 423 comprise tabs which are each wide enough to interrupt two adjacent optical position sensors 420 corresponding to two stator phase windings, as explained in further detail below. The optical position sensors 420 are mounted onto the outside of main housing 295 and optical interrupters 423 pass through the optical position sensors 420 in sequence. For a four pole rotor variant, which is described in greater detail below, the arrangement of the optical interrupters 423 triggers two commutation cycles through the optical position sensors 420 per revolution of the fan 220 or rotor assembly 200. The optical position sensors 420 are operationally coupled to commutation logic circuit board 450 and the commutation logic circuit board 450 in turn controls the power module assembly 400 in order to supply current to the stator phase windings, generally referred to by reference numeral 310, and described in much greater detail below. FIG. 2 also shows terminal block 320 with a start terminal 312 which accepts leads from an outside battery source in order to receive power when operating in starter mode. A more detailed description of the power module assembly 400 and commutation logic circuit board 450 is provided further below.

Figure 3:
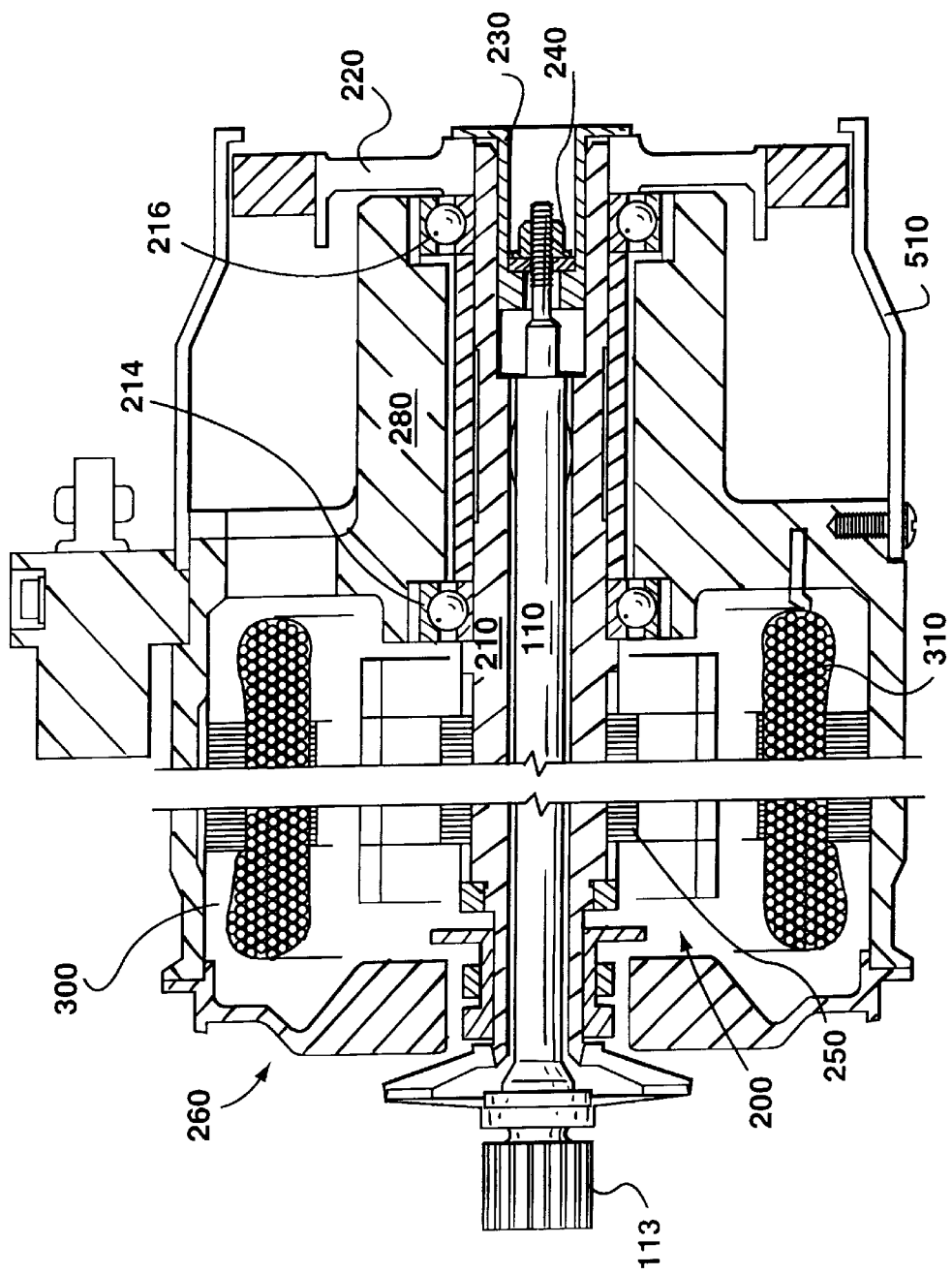
FIG. 3 shows a side cross-sectional view of a rotor, rotor shaft, and drive shaft assembled inside the stator assembly and stator housing of FIG. 2.

In FIG. 3, the rotor assembly 200 is shown mounted within the stator assembly 310. The power module assembly 400, commutation logic circuit board 450, and optical position sensor assembly 420, shown in FIG. 2, are not shown in FIG. 3. A front cover 510 protects the fan 220 but leaves an opening for air to be drawn inside. At the downstream end, an end bell assembly 260 covers the downstream side of stator housing 300, but allows air to escape through a grill (not shown).

Together, FIGS. 2 and 3 show a compact arrangement for the power module assembly 400 and associated logic control (commutation logic circuit board 450), all of which are contained within the front cover 510 and which are air-cooled by fan 220 during operation. It is noted that the compact and modular design of the power module assembly 400 and commutation logic circuit board 450 will facilitate easier and less expensive maintenance. A more detailed description of the power module is provided further below.

Figure 4A:
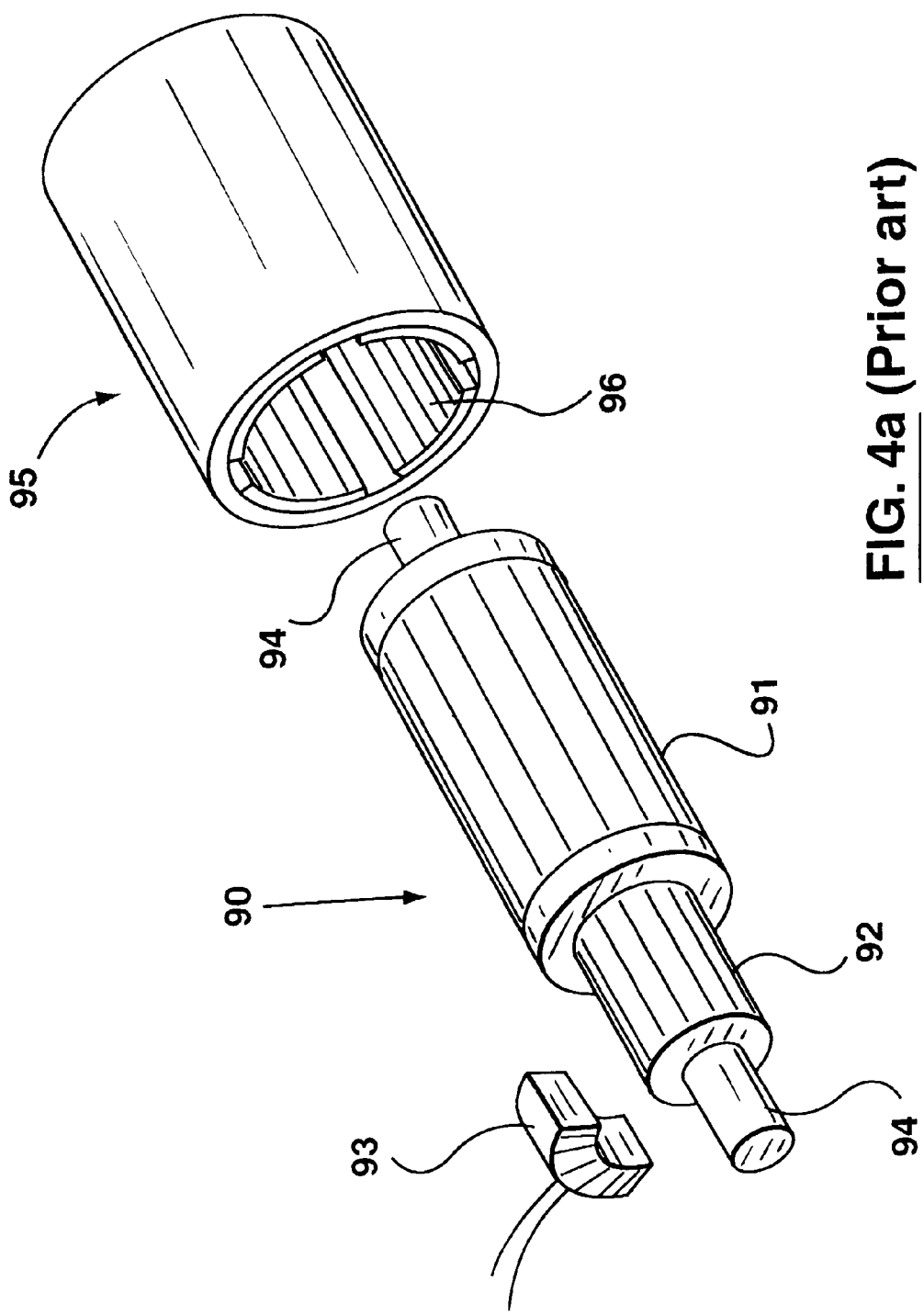
FIG. 4a shows an isometric view of a typical armature assembly found in prior art aircraft S/Gs.

Now referring to FIG. 4a, a simplified isometric view of a typical armature assembly and stator assembly found in prior art aircraft S/Gs is shown. The armature assembly 90 has an armature 91 with a generally cylindrical shape and a commutator 92 directly adjacent the armature 91. Both the armature 91 and commutator 92 are mounted on an armature shaft 94. One of a number of commutation brushes 93, which comes in contact with commutator 92, is also shown. A stator assembly 95, having a generally hollow cylindrical shape, has stator windings 96 running along the inner surface. When the armature assembly 90 is inserted into the stator assembly 95, there is typically very little air space between them. Consequently, the effectiveness of air cooling is significantly reduced. In order to depart from the cylindrical armature designs of prior art aircraft S/Gs, and to entirely avoid the use of commutators and commutation brushes, the present invention uses a multi-pole rotor design adapted from industrial AC and DC motors not typically used as aircraft S/Gs.

Figure 4B:
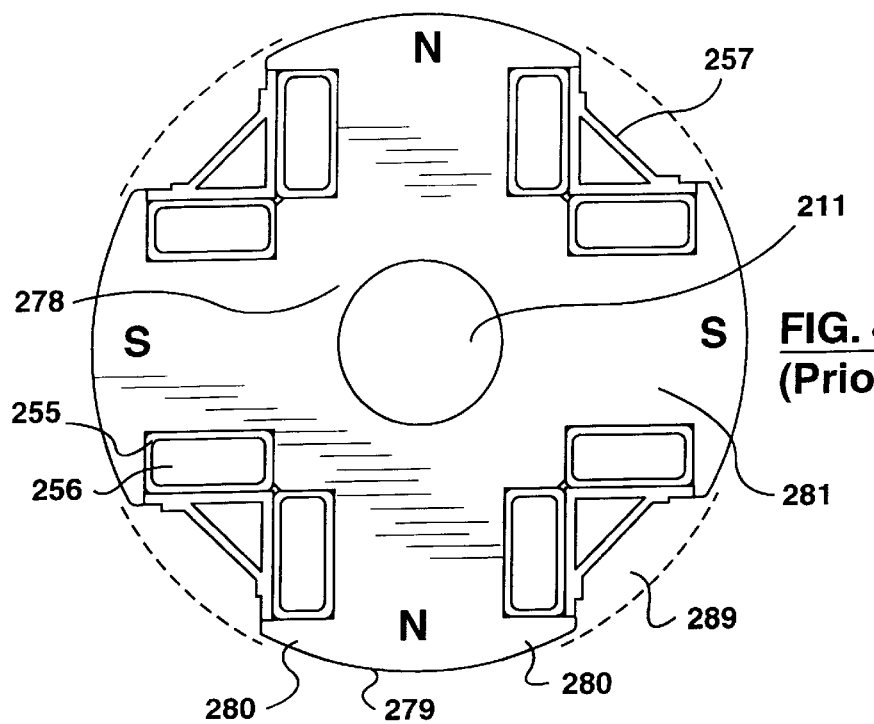
FIG. 4b shows a cross-sectional view of a prior art four pole rotor core.

FIG. 4b shows a four pole example of a prior art rotor core design. As shown, rotor windings 256, insulated by insulation 255, are wound around arms 281 attached to a central hub 278. Attached to the end of each arm 281 is a rotor pole face 279 having extended tips 280. While the extended tips 280 provide support for the rotor windings 256 as the rotor assembly rotates at high-rotational velocity, the wide rotor pole face 279 resulting from the extended tips 280 has some significant drawbacks which will be described in greater detail further below.

As also shown in FIG. 4b, the rotor windings 256 are wound so as to produce north poles at two opposite rotor pole faces, and south poles at the remaining two rotor pole faces. Wedges 257 contain the rotor windings 256. An air space 289 is formed between the wedges 257 and the inner surface of the stator assembly (shown as a dashed line). Also shown at the centre of the rotor core is an opening 211 for a rotor shaft 210.

Figure 5A:
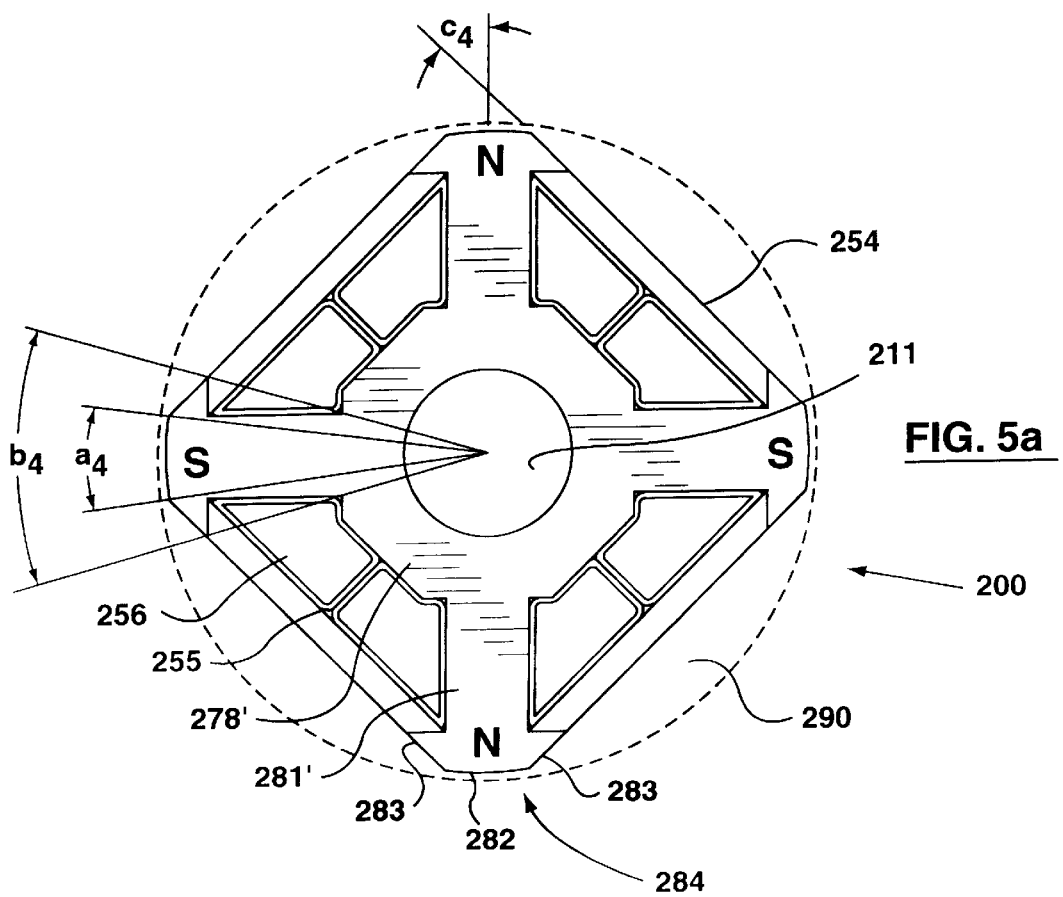
FIG. 5a shows a cross-sectional view of the preferred embodiment of a four pole rotor core.

FIG. 5a shows a cross-sectional view of a preferred four pole rotor embodiment of the present invention. As with the prior art rotor core, the preferred embodiment in FIG. 5a has a rotor core hub 278' which corresponds to the rotor core hub 278 of FIG. 4b. However, the preferred rotor core hub 278' has been reduced in cross-sectional area to accommodate more rotor windings 256 closer to the central opening 211. As with the prior art rotor core, the preferred rotor core has four arms 281' extending radially from the hub 278'. Located at the end of each arm 281' is a flanged formation 284. The width of the entire flanged formation 284 is contained within a sector (angle $b_4$) between 30° and 40° as measured between a first pair of straight lines extending from the centre of opening 211 and touching the outer edges of the flanged formation 284.

Each flanged formation 284 has an outer edge opposite the arm 281'. The outer edge comprises an outer-most pole face surface 282 which is in close proximity to the inner surface of the stator assembly (shown as a dashed circle). The outer-most pole face surface 282 has a width contained within a sector (angle $a_4$), ranging between 10° and 25° as measured between a second pair of straight lines extending from the centre of the opening 211. On each side of the outer-most pole face surface 282 are two side pole face surfaces 283 which may slope away from the inner surface of the stator assembly (shown as a dashed circle). Preferably, the two side pole face surfaces 283 slope away from the inner surface of the stator assembly at an angle $c_4$ between 5° and 85°, and preferably between 40° and 70°, from a line bisecting the arm 281'. Alternatively, it is possible that the outer-most pole face surface 282 simply extends into the two side pole face surfaces 283 without having a noticeable boundary, i.e. with a curve forming the transition between them.

In effect, the extended tips 280 present in the prior art rotor core of FIG. 4b have been largely removed. The reduced width of the flanged formation 284, generates a more concentrated flux distribution which results in an improved commutation current waveform, as discussed in greater detail below.

Still referring to FIG. 5a, rotor windings 256 are shown wound around the arms 281' so as to form two north poles at opposite corners, and two south poles in the remaining two corners. Due to the effective removal of extended tips 280 (FIG. 4b), it is no longer possible to wind the rotor windings 256 in the same manner as shown in FIG. 4a. As a result, non-magnetic stainless steel plates 254 are used to contain the rotor windings 256. Other suitable materials for the plates may also be used. The non-magnetic stainless steel plates 254 are insulated from the rotor windings 256 by an insulating layer 255. This arrangement of the rotor windings 256 and use of steel plates 254 to contain the windings results in a significant increase in the air space 290 between the rotor assembly 200 and the inner surface of the stator assembly (shown as a dashed circle), as compared with the FIG. 4b (prior art) version, and particularly with respect to prior art aircraft S/G designs, as shown in FIG. 4a.

Figure 5B:
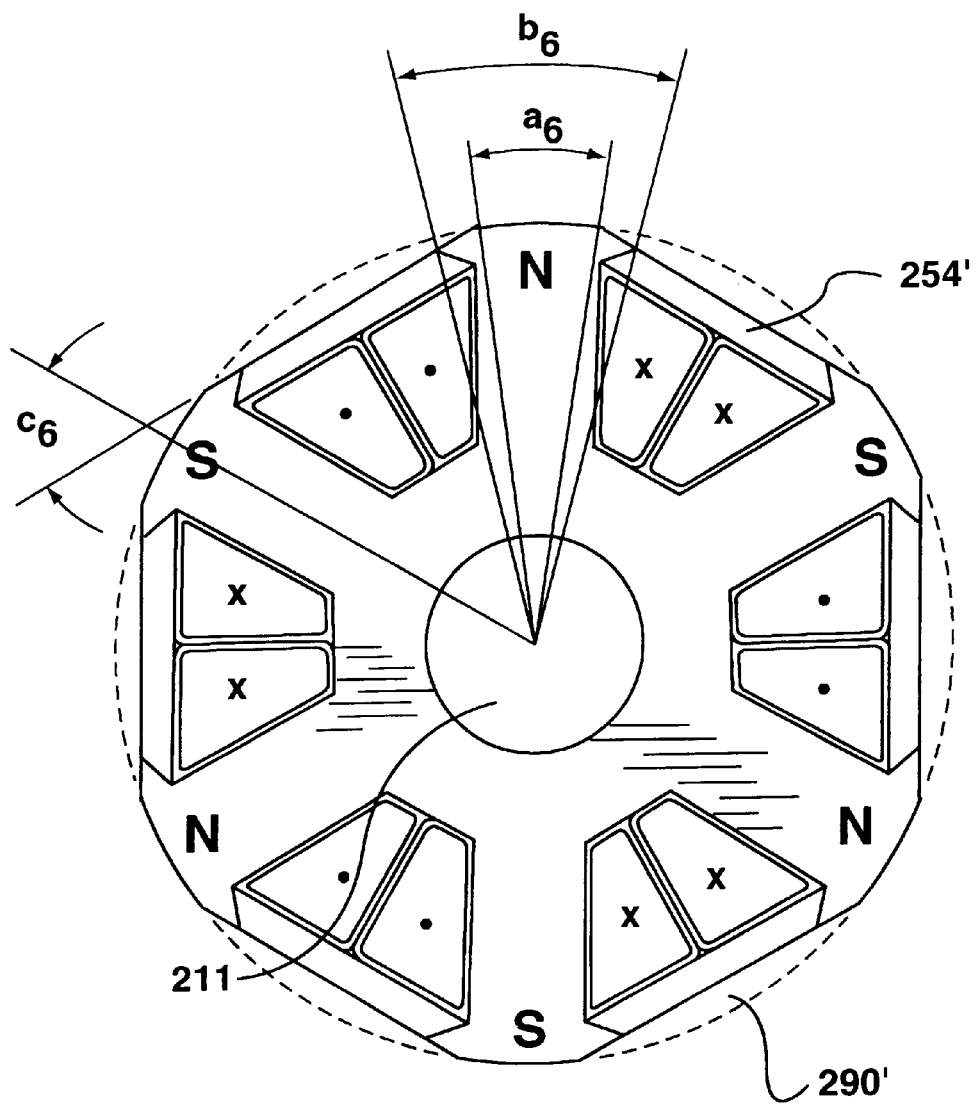

It is possible to extend the concepts shown in FIG. 5a to a six pole rotor design, as shown in FIG. 5b. The six pole rotor variant of the preferred rotor design is shown with six steel plates 254' positioned between adjacent pole faces. Here, the air space 290' is significantly reduced as compared to the preferred four pole rotor variant. However, this still represents an improvement over the prior art aircraft S/G design shown in FIG. 4a. As compared to the preferred four pole rotor variant, the six pole design is capable of greater torque and, therefore, can operate at approximately ⅔ of the rotational velocity of the preferred four pole rotor variant. However, the objective of achieving a more concentrated flux distribution by using a reduced pole face remains the same. The value of angle $a_6$ is preferably between $10° \times (\frac{2}{3})$ and $25° \times (\frac{2}{3})$; the value of angle $b_6$ is preferably between $30° \times (\frac{2}{3})$ and $40° \times (\frac{2}{3})$; and the value of angle $c_6$ is between 5° and 85° and preferably between 40° and 70°. More generally, the values for angles $a_F$ and $b_F$, where F is the number of rotor poles, can be expressed as follows: the preferred value of angle $a_F$ is between $10° \times (4/F)$ and $25° \times (4/F)$; and the preferred value of angle $b_F$ is between $30° \times (4/F)$ and $40° \times (4/F)$. Preferably, the value of F is one of four and six, but can also be two or eight. While a two, four, six, or even an eight pole rotor design can be used to practise the teachings of the present invention, the remainder of the disclosure will focus on the preferred four pole rotor design, along with a discussion of the necessary changes for a six pole rotor variant.

Figure 6:
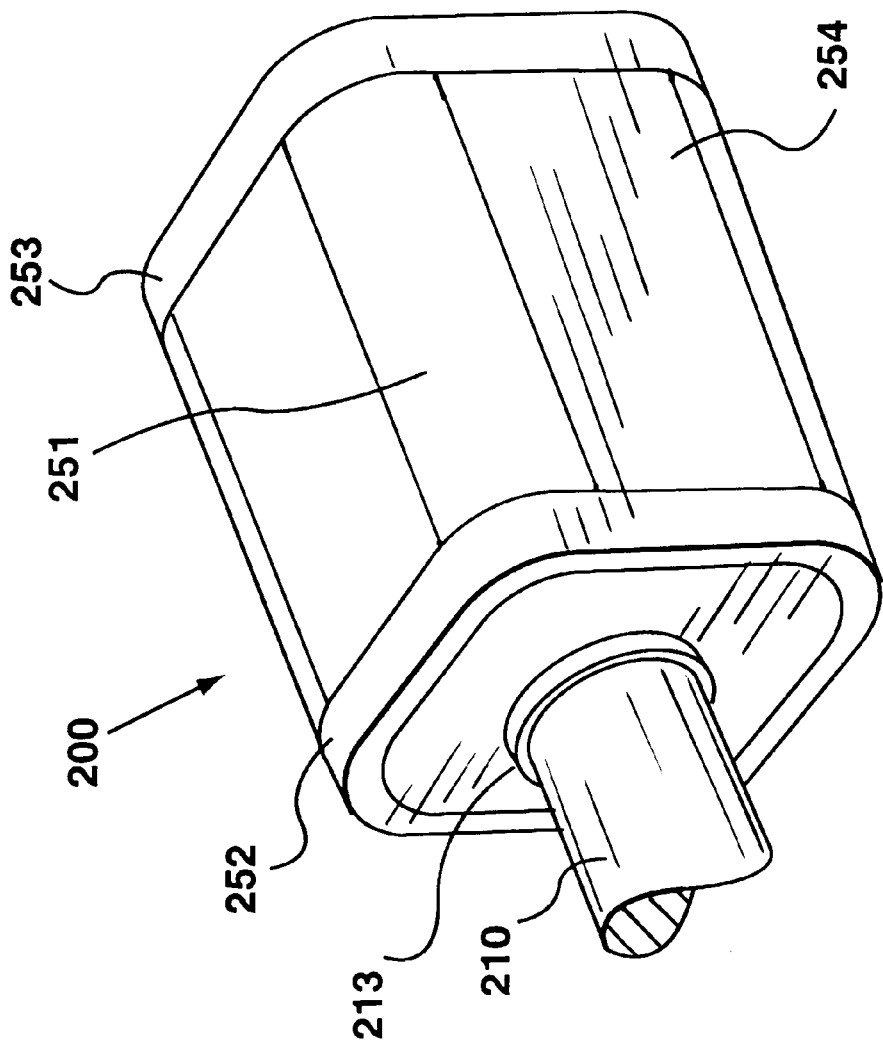
FIG. 6 shows an orthogonal view of the preferred four pole rotor assembly.

Now referring to FIG. 6, forming the rotor core 250 are a plurality of laminate cutouts as shown in FIG. 5a. In order to form the rotor core 250, a plurality of the laminate cutouts are aligned and stacked until the desired length of the rotor core is obtained. The stacked laminate cutouts are then welded along the aligned outer edges of the stack so as to form an integral unit. The outer edge of the reduced flanged formation 284 of FIG. 5a, comprising the outer most pole face surface 282 and two side pole face surfaces 283, forms a rotor pole face 251 at a corner of the rotor assembly, as shown in FIG. 6. Further shaping of the rotor pole face 251 area is possible to fine-tune the shape of the current wave form obtained using a rotor core of this design. In addition, as shown in FIG. 6, rotor end plates 252, 253 cover either end of the stator core 250, thus protecting the ends during high-velocity rotation.

As shown in FIG. 6, when fully assembled, the rotor assembly 200 has a cross-section which is generally square with rounded corners. It has been determined by the inventor that the shape of the rotor pole face 251 of the present invention provides a desirable current waveform for generating high starting torque while also maintaining high efficiency. This aspect of the invention is described in greater detail below.

The details of the stator phase windings for use with the preferred four pole rotor variant will next be discussed. FIG. 7a shows, the winding path for two of the twelve main phase winding segments. The path for phase 1, identified as P1, is shown entering a stator slot 330, then winding through every sixth stator slot in an alternating manner, and leaving from stator slot 331. (For the sake of clarity, the discussion that follows always assumes that the rotor is rotating in a counter-clockwise direction. Also, the winding path of the phase windings are assumed to be in the direction of rotation of the rotor, i.e. counter-clockwise, although it will be understood that this winding "direction" is arbitrary.) As there are twenty-four stator slots, every sixth stator slot is separated by 90°. Also, while only one turn for the P1 winding is shown, in practice the P1 winding will be routed through the same winding path many times. FIG. 7a also shows the winding path for phase 7 (P7) which shares the same four stator slots as used by P1. However, as indicated, the direction of P7 is opposite that of P1. Again, while only one turn for P7 is shown in FIG. 7a, in practice P7 will be wound through the same winding path many times. The number of turns of P1 and P7 will generally be equal. In summary, FIG. 7a shows four stator slots having two of twelve main phase winding segments, namely P1 and P7, being wound in an opposite direction in each of the four slots. The other ten phases are wound in a similar manner with each pair of phase winding segments occupying four of the remaining twenty stator slots. Referring to FIG. 7a, the next stator slots in the counter-clockwise direction 330', 331', will be occupied by phase 2 (P2) and phase 8 (P8), the direction of P2 and P8 being opposite. Continuing in a similar fashion, phase 3 (P3) is matched to phase 9 (P9), phase 4 (P4) is matched to phase 10 (P10), phase 5 (P5) is matched to phase 11 (P11), and phase 6 (P6) is matched to phase 12 (P12). Once all twelve phases are wound, all twenty-four stator slots will be occupied. Generally speaking, the phase winding segments for P1–P6 are wound in the same direction, and the phase winding segments for P7 through P12 are wound in the opposite direction. The purpose of the oppositely wound phases will be explained in detail further below.

While not shown, it will be understood that, analogously, the phase winding for a six pole rotor design can comprise a stator having thirty six stator slots and twelve phase windings. In this case, the phase windings would be routed through a stator slot every 60° rather than 90°. Again, P1 would be wound opposite P7, P2 would be wound opposite P8, P3 would be wound opposite P9, etc. The above described relationship between the number of rotor poles and the number of stator slots can be expressed generally as follows: where F is the number of rotor poles, and if there are twelve phase winding segments, then 6×F stator slots are required. Also, each phase winding segment is routed through every sixth stator slot or at substantially 360°/F intervals from the initial stator slot position. The value of F will normally be one of four and six, however, the value of F can also be two or eight. For any one of the rotor pole designs, the number of stator slots can be doubled as explained further below.

FIG. 7b shows an alternative phase winding path for the preferred four pole rotor variant. As shown, the main phase winding segment P1 is routed through stator slot 330, and then is routed through every sixth stator slot in an alternating manner. However, instead of being routed through only four stator slots as shown in FIG. 7a, P1 is also routed through a secondary phase winding segment in the next adjacent stator slots in the forward direction, entering at stator slot 330' and leaving at stator slot 331'. While FIG. 7b only shows two turns, one turn for the main phase winding segment P1, and another turn for the secondary phase winding segment P1', in practice, there will be many turns of main phase winding segments P1 and many turns of secondary phase winding segments P1', although not necessarily the same number of turns.

It will be understood that the introduction of secondary phase windings for the four pole rotor variant can be extended to a six pole rotor variant, with the necessary adjustments (i.e. the stator phase windings will be routed through a stator slot every 60° for a six pole rotor variant.

If the number of stator slots are doubled for any one of the rotor variants, as previously discussed, then a pair of adjacent stator slots can be considered to be one stator slot for the purpose of the phase windings. In this case, a main phase winding segment would be distributed substantially evenly between each pair of adjacent stator slots, and a secondary phase winding segment, if any, would be wound through the next adjacent slot in the forward direction.

Figure 8A:
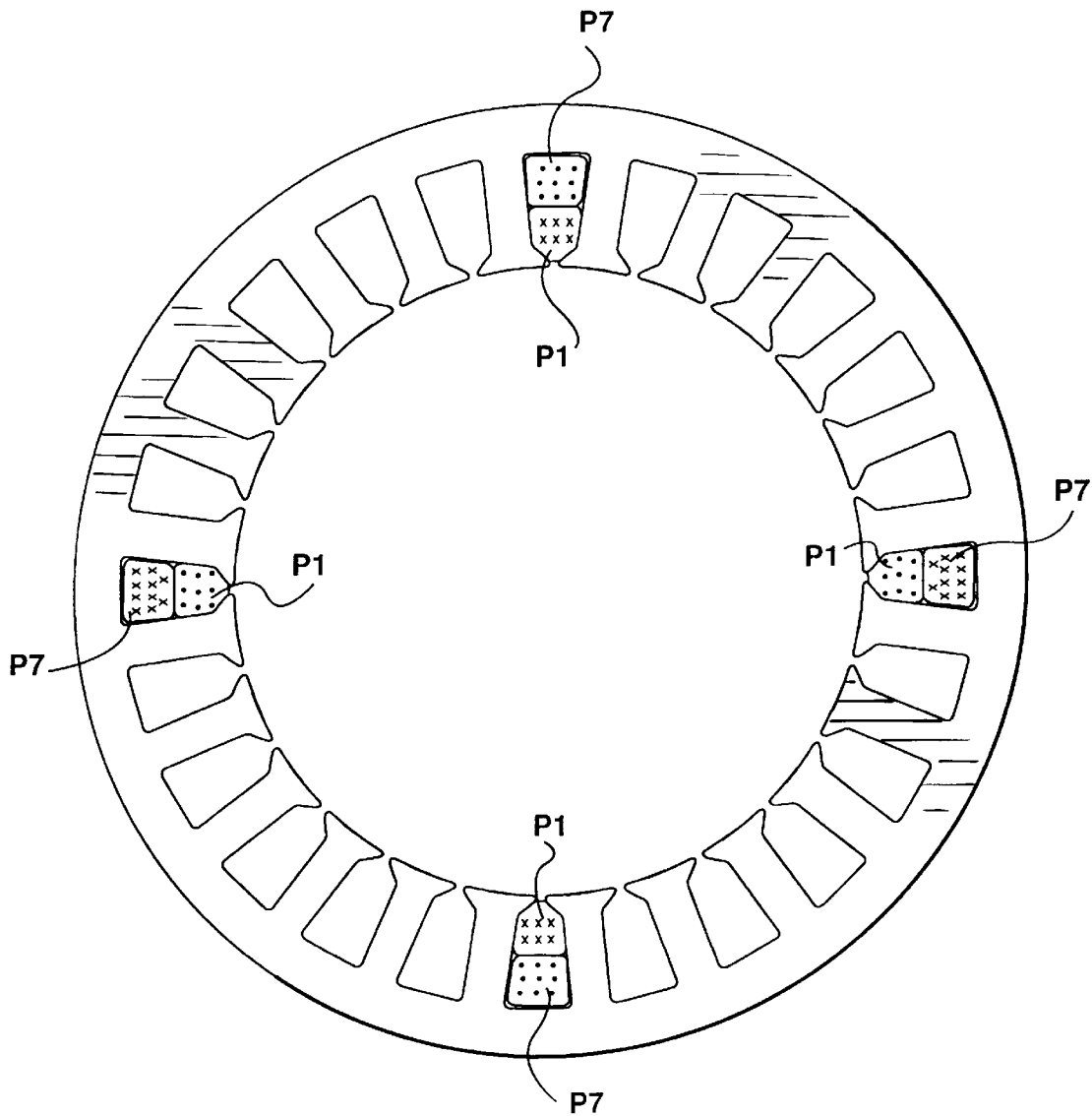
FIG. 8a is a cross-sectional view of the winding arrangement illustrated in FIG. 7a but having multiple turns so as to completely fill the stator slots.

FIG. 8a shows a cross-sectional view of the winding arrangement shown in FIG. 7a, with the phase winding segments for P1 and P7 sharing four stator slots, each separated by 90°. As P1 and P7 have an equal number of turns, each phase occupies substantially one half of the space in each stator slot. While FIG. 8a shows the P1 windings located on the inside and P7 windings located on the outside, it has been found that there is no appreciable difference resulting from the position of the windings, whether on the inside or outside. The P1 windings could just as easily occupy the outside of the stator slots, or phases P1 and P7 could alternate between being wound on the outside or inside of the stator slot through each 90° change in direction. Yet another possibility is alternating the distribution of the phase windings within each stator slot. This description would also apply to a six pole rotor variant, with the necessary adjustments for the number of times a phase winding is routed through a stator slot per turn, as described above with respect to FIG. 7a.

The cross-sectional view of the other pairs of phase windings, P2 and P8, P3 and P9, P4 and P10, P5 and P11, and P6 and P12, are similar to the cross-sectional view shown in FIG. 7a, except that the stator slot positions are moved ahead by one, respectively, for each pair of phase windings.

Figure 8B:
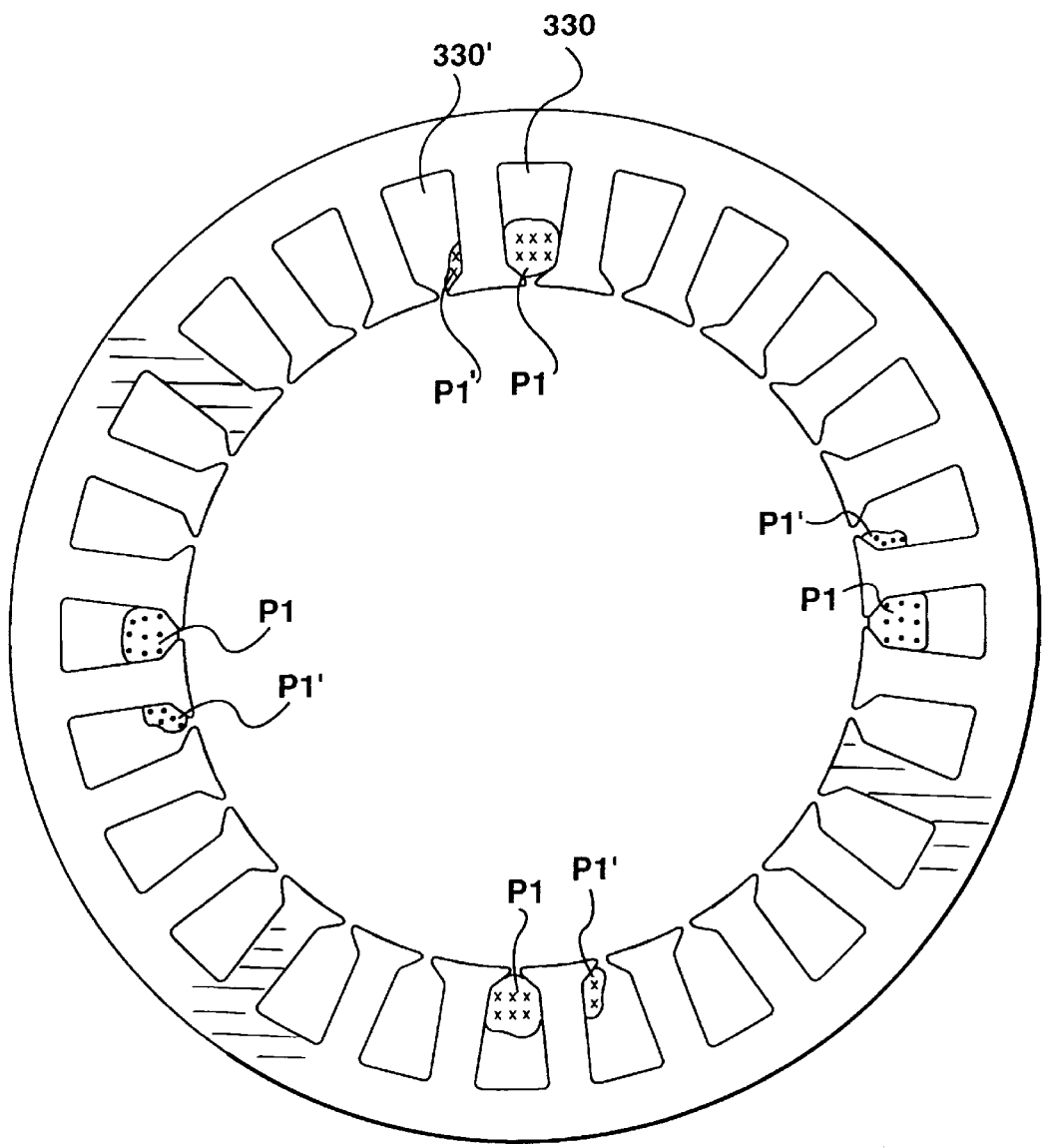
FIG. 8b is a cross-sectional view of the winding arrangement illustrated in FIG. 7b where every sixth turn is routed through the next adjacent slot in the forward direction to form the secondary winding segments.

Now referring to FIG. 8b, the winding arrangement of FIG. 7b is shown in cross-section. As discussed earlier, it is not necessary to have an equal number of turns for the main phase windings and secondary phase windings shown in FIG. 7b. In a preferred embodiment, the ratio of the number of turns for the secondary windings as compared to the number of windings for the main windings is 1:5, but this ratio can vary between 1:3 and 1:7. Expressed generally, if the desired turn ratio of secondary phase windings to main phase windings is 1:N, then every $(N+1)^{th}$ turn of the phase winding segments is offset by one stator slot position in the forward direction of the rotor. As shown in FIG. 8b, the cross-sectional area of the secondary phase windings P1' is roughly ⅕ of the cross-sectional area of the main phase winding P1. In order to achieve this ratio, every sixth turn is wound to form the secondary phase windings. While the secondary phase windings P1' are shown in a specific region of the next adjacent stator slot 330', the secondary phase windings are not necessarily restricted to this region of the next adjacent stator slot 330'. Similarly, a secondary phase winding can be introduced in the six pole rotor variant with the necessary adjustments for the number of times a phase winding is routed through a stator slot per turn, as described above with respect to FIG. 7b.

The cross-sectional view of the other pairs of phase windings, P2 and P8, P3 and P9, P4 and P10, P5 and P11, and P6 and P12, are similar to the cross-sectional view shown in FIG. 7b, except that the stator slot positions are moved ahead by one, respectively, for each pair of phase windings.

Figure 9A:
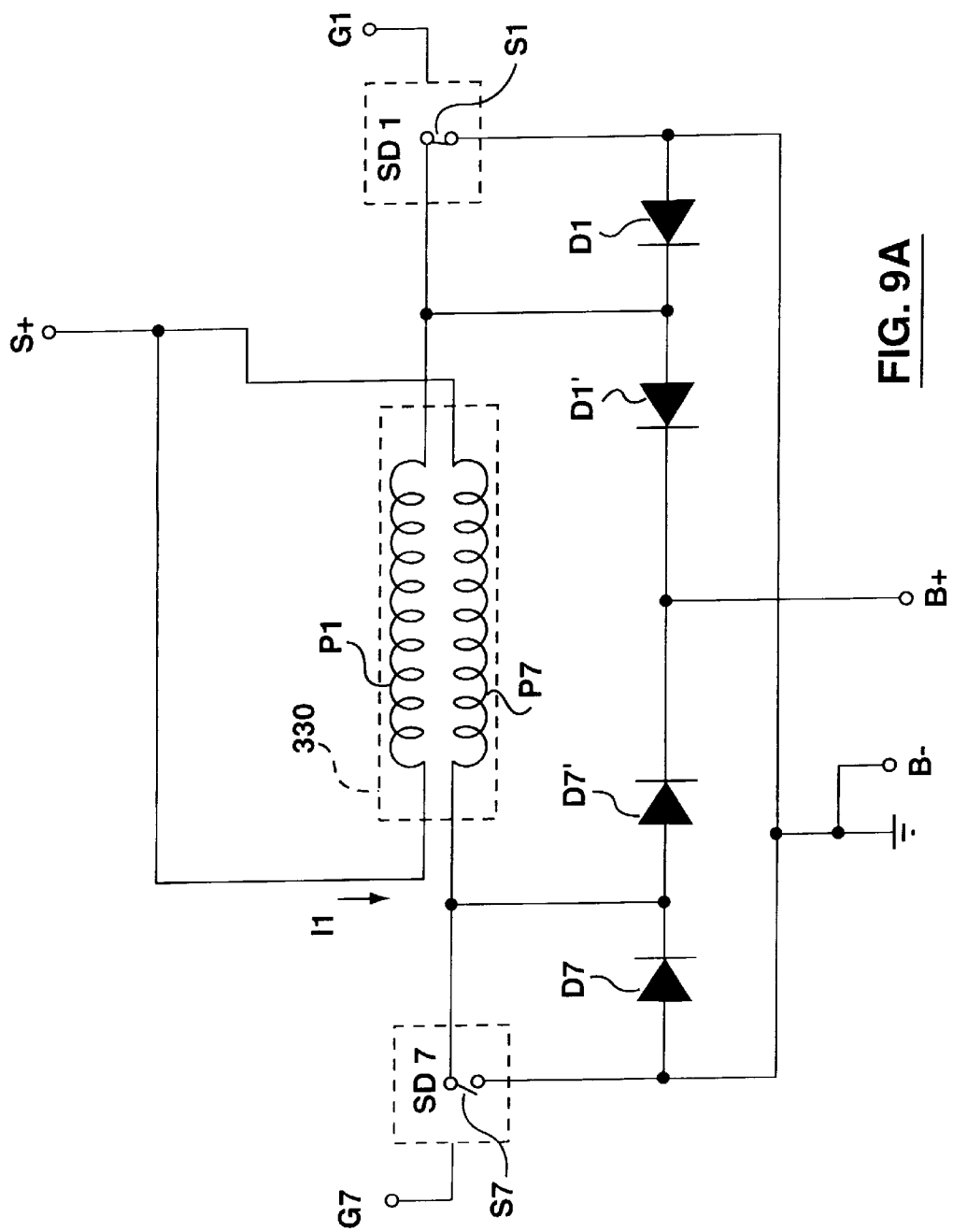
FIG. 9a is a simplified circuit diagram showing the opposing main phase winding segments in each stator slot.

In FIG. 9a, a simplified circuit diagram shows main phase winding segment P1 and main phase winding segment P7 wound in opposite directions in stator slot 330. Both phase windings P1 and P7 are connected at a first end to a common voltage source S+. A second end of P1 is connected to the cathode of diode D1 and the anode of diode D1'. The second end of P1 is also connected to switch S1 within solid state switching device SD1. When switch S1 is closed, as shown in FIG. 9a, the second end of P1 is connected to the anode of diode D1 and also connected to terminal B– (ground). Similarly, a second end of P7 is connected to the cathode of diode D7 and the anode of diode D7+. The second end of P7 is also connected to switch S7 within solid state switching device SD7. In FIG. 9a, switch S7 is shown as open. If switch S7 was closed, the second end of P7 would be connected to the anode of diode D7 and terminal B– (ground). The cathodes of diode D1' and D7' are connected to a common terminal B+. The switches S1 and S7 are controlled by signals applied at terminal G1 and terminal G7, respectively. The sequence and timing of the signals applied at terminals G1 and G7 are determined by the commutation logic which will be described in greater detail below. (It should be noted that in starter mode either switch S1 or switch S7 will be closed at any one time. Both switches S1 and S7 are not open at the same time unless the S/G is operating in generator mode, as explained further below.) In FIG. 9a, a signal is being applied at terminal G1, which causes switch S1 to close, completing a path between applied voltage S+ through phase winding P1 and into terminal B– (ground). No separate voltage is applied to terminal B+ during the start phase, and initially, the voltage being applied at terminal S+ also appears at terminal B+. While voltage S+ is being applied to both P1 and P7, terminal B+ remains open and current is not allowed to flow through P7. However, for P1, because switch S1 is closed, a path is available from terminal S+ through P1 to terminal B– (ground). As terminal B– is ground, a path is now open for current I1 to flow through P1.

Figure 9B:
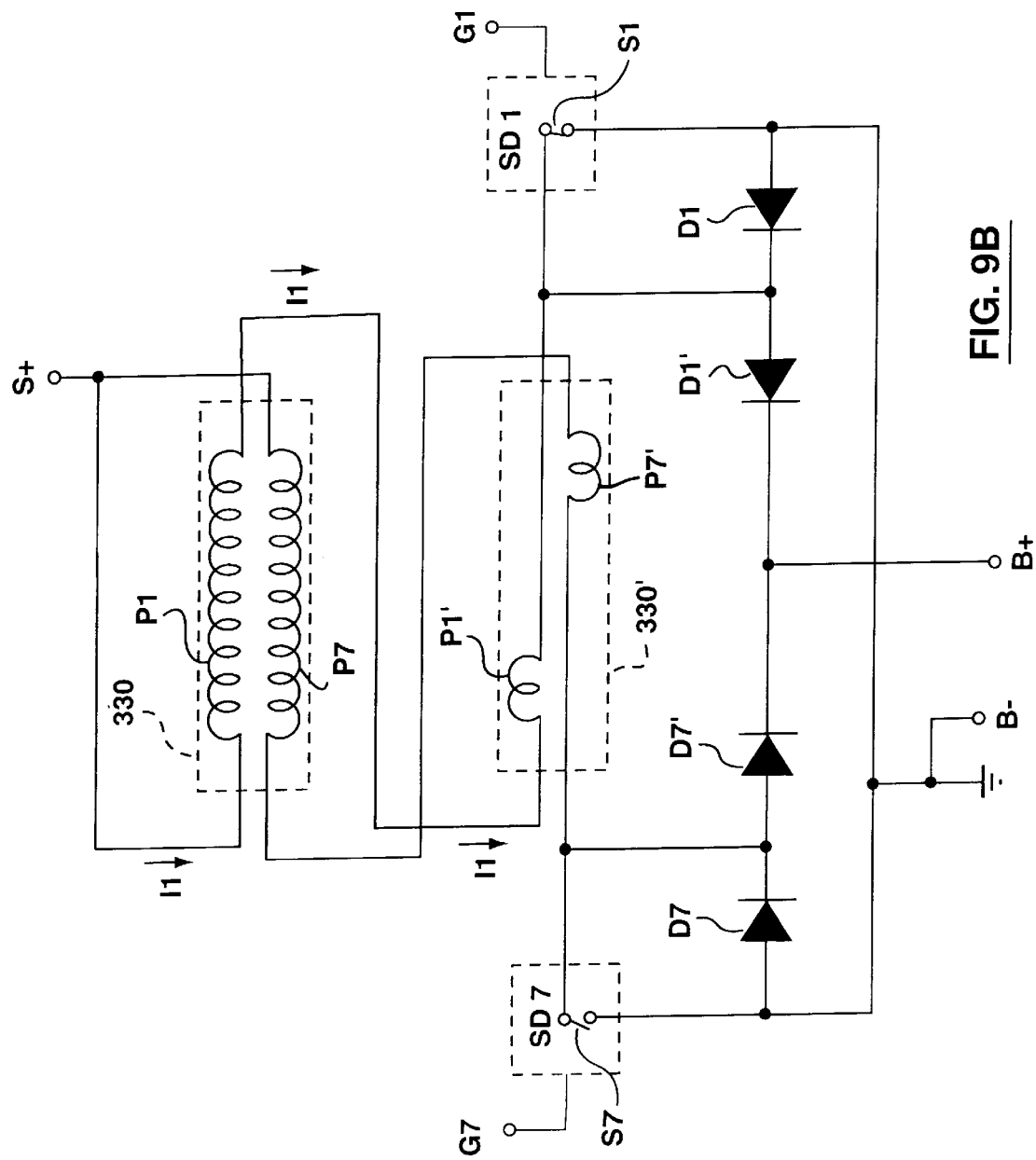
FIG. 9b is a simplified circuit diagram showing the main phase winding segments together with the secondary phase winding segments positioned in the adjacent stator slots in the forward direction.

FIG. 9b shows a modified version of the simplified circuit shown in FIG. 9a. In FIG. 9b, in addition to main phase windings P1 and P7, secondary phase windings P1' and P7' are also shown. Referring back to FIG. 7b, the winding path of main phase winding P1 and secondary phase winding P1' is shown, the secondary phase winding P1' being routed through an adjacent stator slot next to main phase winding P1. As shown in FIG. 9b, the main phase windings and secondary phase windings are connected in a series. The advantage of this winding arrangement is discussed further below. Other than the addition of secondary phase winding segments in series, the operation of the circuit shown in FIG.

9b is identical to the operation of the circuit in FIG. 9a. While FIGS. 9a and 9b show current flowing through P1 and P1' only, it is to be understood that, based on the commutation sequence, switch 7 may be closed and switch 1 may be open, causing current to flow through P7 and P7'.

Figure 10:
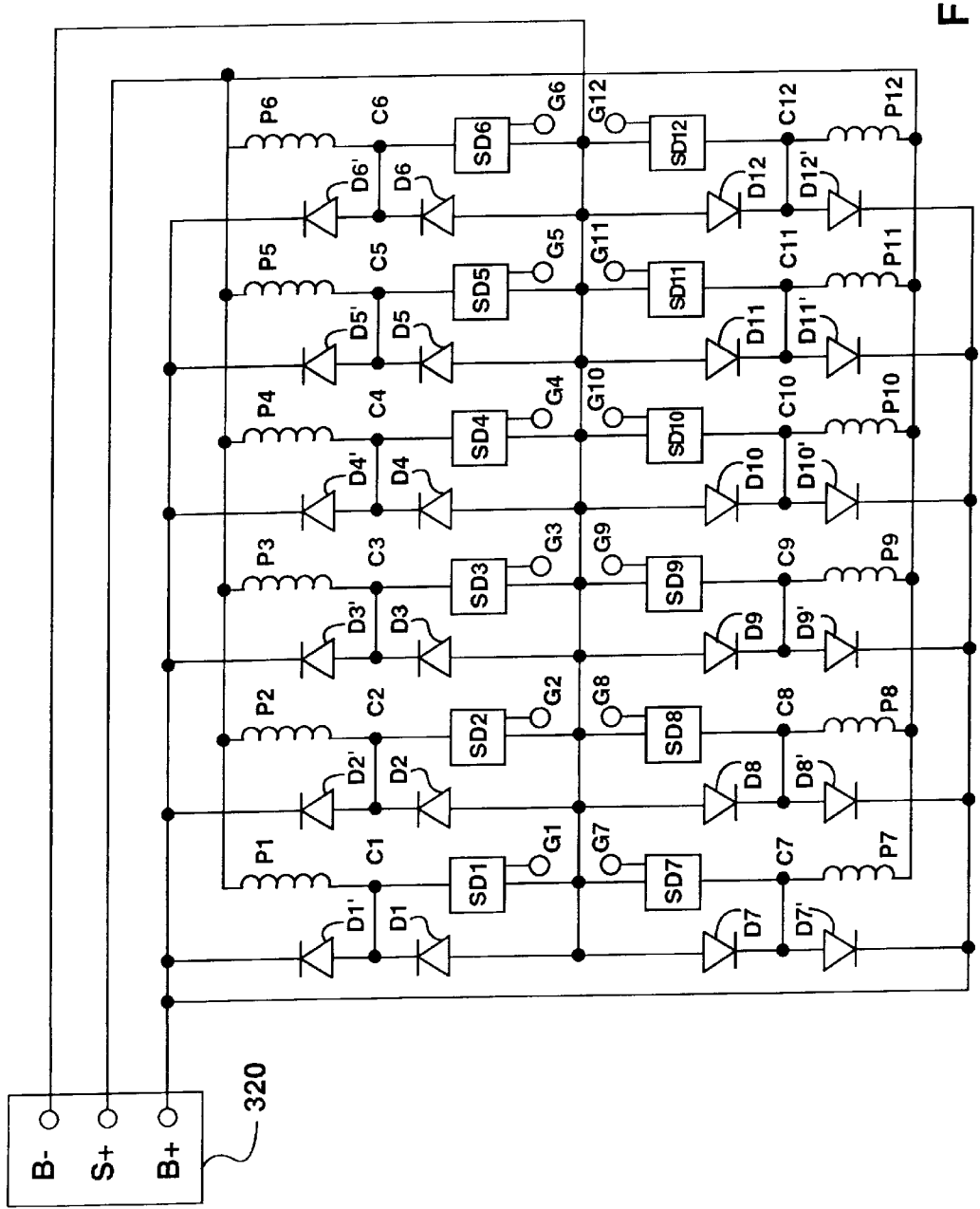
FIG. 10 is a simplified circuit diagram showing twelve main phase winding segments interconnected to diodes, solid state switching device modules and a terminal block.

Now referring to FIG. 10, a simplified circuit diagram shows the inter-connection between all of the phase windings P1–P12. Shown in FIG. 10 are diodes D1, D1', D7 and D7', solid state switching devices SD1 and SD7, terminals G1 and G7, phase windings P1 and P7, and a terminal block with terminals B–, S+ and B+, all of which correspond to identically referenced components shown in FIG. 9a. As illustrated in FIG. 10, an identical parallel arrangement is shown for pairs of phases P2 and P8, P3 and P9, P4 and P10, P5 and P11, and P6 and P12. The solid state switching device pairs SD2 and SD8, SD3 and SD9, SD4 and SD10, SD5 and SD11, and SD6 and SD12, serve the same function as solid state switching devices SD1 and SD7, respectively, as shown in FIGS. 9a and 9b. The solid state switching devices SD1-SD12 control whether or not a current is allowed to flow through the corresponding phase windings P1–P12. The solid state switching devices SD1–SD12 are, in turn, controlled by commutation signals applied at corresponding terminals G1–G12. The commutation sequence and the arrangements of the phase winding pairs are explained in greater detail below. Diodes D2–D6, D8–D12, D2'–D6', and D8'–D12' perform the same function as corresponding diodes D1, D7, D1', and D7' shown in FIGS. 9a and 9b, with the necessary changes to corresponding phases and solid state switching device modules.

Still referring to FIG. 10, connection points C1–C12 are also shown. These connection points represent the point at which the stator assembly containing phase windings P1–P12 are connected to the power commutation module, as explained further below.

Figure 11:
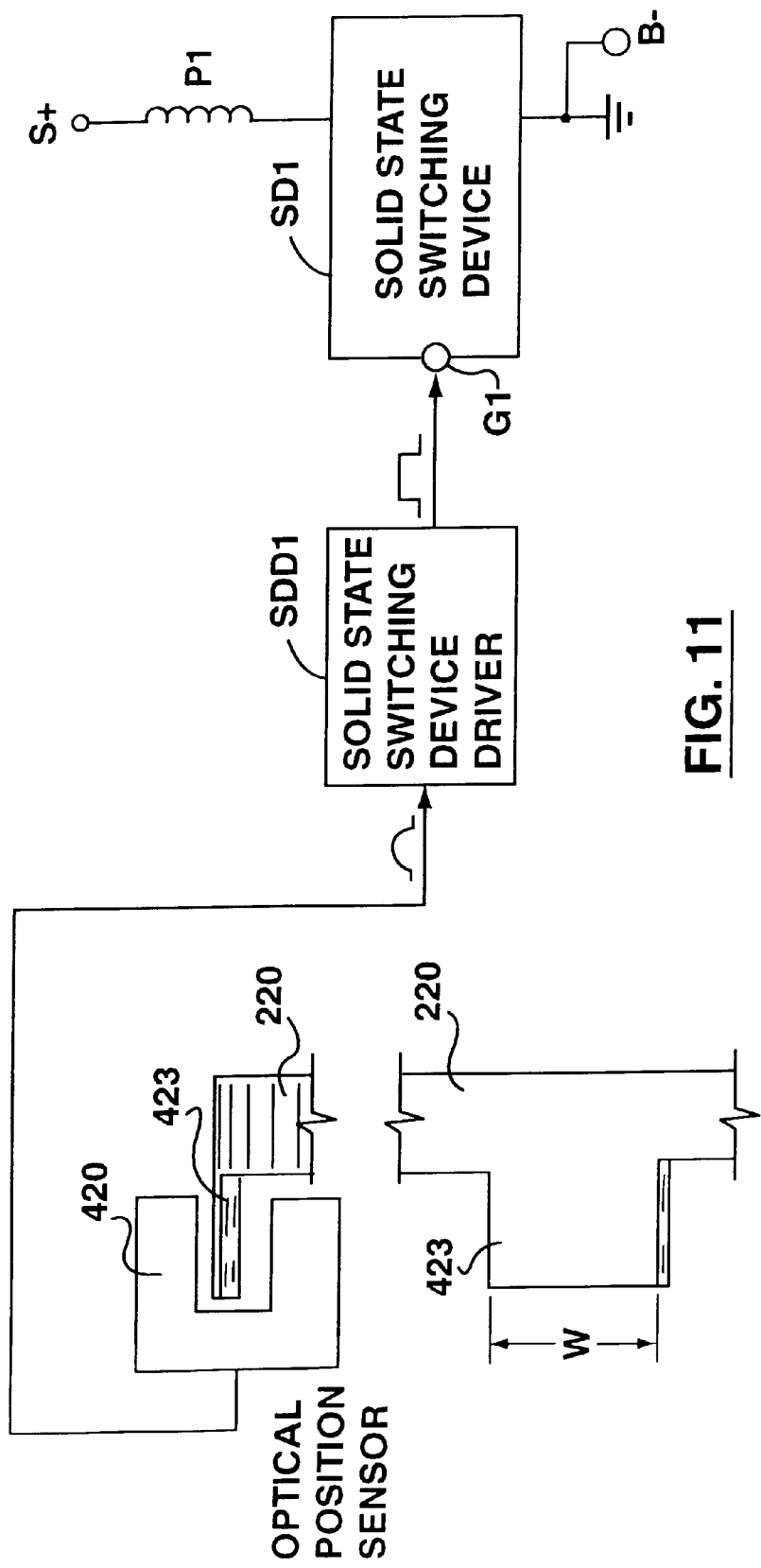
FIG. 11 is a block diagram which illustrates electronic commutation wherein an optical position sensor assembly is interconnected to a solid state switching device driver and corresponding solid state switching device module.

Now referring to FIG. 11, a block diagram illustrates the electronic commutation operation. Shown in FIG. 11 is an optical position sensor 420 corresponding to phase winding P1. As understood by one skilled in the art, an optical interruptor 423 (also shown in FIG. 1) is used to interrupt the optical position sensor 420. This causes a signal to be applied at the input terminal of a solid state switching device driver SDD1. The optical interruptor 423 is normally attached to the rotating fan 220, thus travelling in a circular path in periodic fashion. Other optical position sensors corresponding to the other phase windings P2–P12 are lined up in order next to each other within the rotating path of optical interruptor 423. In FIG. 11, only the commutation of phase winding P1 is illustrated. The solid state switching device driver SDD1 receives the signal output from the optical position sensor 420, and produces a squared wave at its output which is in turn applied to terminal G1 of solid state switching device SD1. The squared wave signal applied at terminal G1 causes the solid state switching device SD1 to complete a circuit from terminal S+ down to terminal B– or ground. This allows current to flow through phase winding P1. In the preferred embodiment, the width of optical interrupter 423 is adjusted so that at least two adjacent optical position sensors 420, corresponding to two adjacent phase windings, say P1 and P2, are interrupted at any one time. For a four pole rotor variant, two optical interrupters 423 are positioned at 180° intervals so that two commutation cycles are triggered per revolution of the rotor assembly 200 or fan 220.

It will be understood that the electronic commutation operation described above, where there are twelve phase windings, is independent of the number of poles on the rotor. Consequently, the above description would also apply where twelve phase windings are used in conjunction with a six pole rotor variant, with the necessary adjustments for the number of interrupters 423 and their position. That is, for a six pole rotor variant, there would be three interrupters 423 positioned at every 120° interval to trigger three commutation cycles per revolution of the rotor assembly of FIG. 5b. As discussed above, these interruptors 423 comprise tabs which are wide enough to interrupt two adjacent optical position sensors 420 at a time. The distribution of the optical position sensors will have to be adjusted to accommodate the shortened degree of rotation per commutation cycle for the six pole variant (i.e. during each commutation cycle, an interrupter rotates through one-third of a revolution for a six pole variant rather than through one-half of a revolution for a four pole variant).

Now referring to the series of drawings in FIGS. 12a–12l, the commutation sequence is illustrated in detail for the preferred four pole rotor variant. FIG. 12a shows the starting point of a commutation cycle with the rotor having north poles at approximately the 12 o'clock and 6 o'clock positions and south poles at approximately the 3 o'clock and 9 o'clock positions. Also shown in FIG. 12a are phase windings P1 and P2 which are wound in the same manner as the winding path for P1 illustrated in FIG. 7a. The winding path for P2 starts in the next adjacent stator path in the counter-clockwise direction, as shown. As discussed previously in reference to FIG. 11, in the preferred embodiment, the optical interrupter 423 interrupts two of the optical position sensors at any one time. Thus, with reference to FIG. 12a, the optical interrupter 423 would be interrupting the optical position sensors 420 corresponding to phase windings P1 and P2. Referring to the north pole at the 12 o'clock position, the current flowing through phase windings P1 and P2 causes a south pole field to be created at approximately the 10 o'clock position, (i.e. substantially half way between the turns at every 90° of phase windings P1 and P2), which acts to attract the rotor north pole at the 12 o'clock position and repels the rotor south pole at the 9 o'clock position. Similarly, a south pole is created at approximately the 4 o'clock position which attracts the rotor north pole at the 6 o'clock position and repels the rotor south pole at the 3 o'clock position. A similar analysis follows for north poles created at approximately the 1 o'clock and 7 o'clock positions. (For the remainder of FIGS. 12b–12l, the rotor is represented simply by a four pole "cross", but has all of the features previously described with reference to FIG. 5a.)

Next, referring to FIG. 12b, phase windings P2 and P3 are shown as active. This would mean that optical interrupter 423 is presently interrupting the optical position sensors 420 corresponding to phase windings P2 and P3. The same analysis as conducted for FIG. 12a follows for FIG. 12b except that the poles have advanced by approximately one stator slot position in the counter-clockwise direction. The same analysis follows for FIGS. 12c–12e except that the pole has advanced by one stator slot position in the counter-clockwise direction in each instance.

In FIG. 12f, phase windings P6 and P7 are shown as active. While phase winding P7 is shown as being at the outer edge of the stator slots, as discussed previously, there is no significance to the placement, outside or inside, within each stator slot. Phases P1–P6 could just as easily be placed on the outside as on the inside, and phases P7–P12 could just as easily be positioned on the inside. However, phase winding P7 is wound in a direction opposite to that of phase winding P1, as previously illustrated in FIG. 7a. This is made necessary by the fact that a rotor south pole is now approaching the 12 o'clock position as shown in FIG. 12f. Continuing with FIG. 12g, phase windings P7 and P8 are shown as being active. This means that the optical interrupter 423 is now interrupting the optical position sensors 420 corresponding to phase windings P7 and P8. As discussed previously, the phase windings P7–P12 are wound in the same direction, generally corresponding to the winding path shown for P7 in FIG. 7a. As shown in FIG. 12g, the north pole which started at the 12 o'clock position is now at the 9 o'clock position. In FIG. 12g, stator south poles are now positioned at approximately the 1 o'clock and 7 o'clock positions and stator north poles are positioned at approximately the 4 o'clock and 10 o'clock positions. A similar analysis as performed in FIGS. 12a–12g follows for FIGS. 12h–12l, until the north pole which originally started at the 12 o'clock position is now approaching the 6 o'clock position in FIG. 12l.

In summary, FIGS. 12a–12l illustrate one commutation cycle for phase winding P1–P12, which corresponds to one half of a rotation for the rotor assembly 200 for a four pole rotor variant.

While the above discussion for FIGS. 12a–12l has assumed the winding configuration shown in FIGS. 7a and 8a, it can be extended to the winding configuration shown in FIGS. 7b and 8b with some slight modifications. The effect of the secondary phases windings is described further below in reference to the current waveform shown in FIG. 14.

It will be understood that the above description of the commutation sequence and associated rotation of the rotor can be applied to a six pole rotor variant with appropriate modifications for the degree of rotation. In a six pole rotor variant, the phase windings will be routed through a stator slot every 60° and, consequently, in the time that it takes a four pole rotor variant to turn one half of a revolution, the six pole rotor variant will have turned only one third of a revolution. In all cases, the sequence of phase activation, and the fact that two adjacent phase windings are active at any one time, remain the same.

Figure 13:
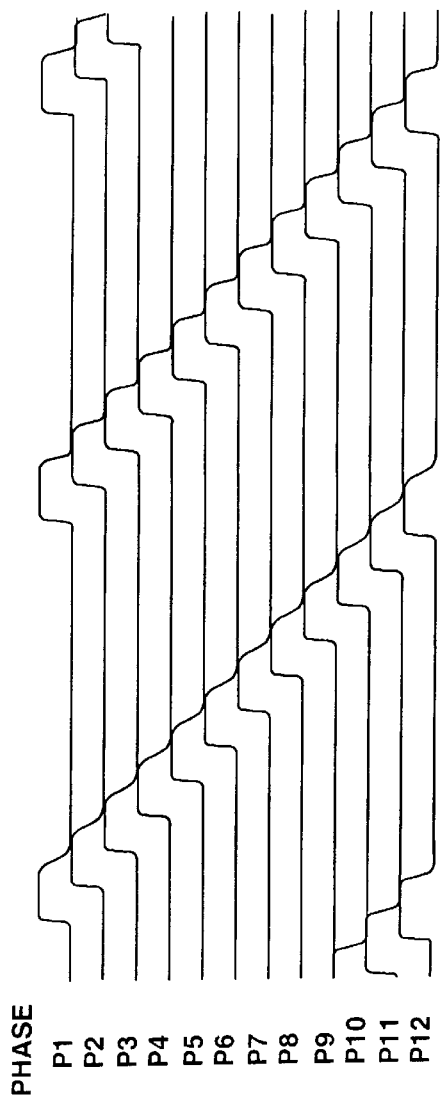
FIG. 13 is a timing diagram showing the sequence of commutation of the twelve phase windings.

Now referring to FIG. 13, a timing diagram is shown for commutation current waves passing through phases P1–P12. As illustrated in FIG. 13, at least two of the phase windings are active at any instant in time. One cascading series of signals from P1–P12 represents one commutation cycle and one half of a rotation of the rotor core. As illustrated in FIG. 13, the signals for phase windings P12 and P1 overlap and the commutation cycle begins again.

Figure 14:
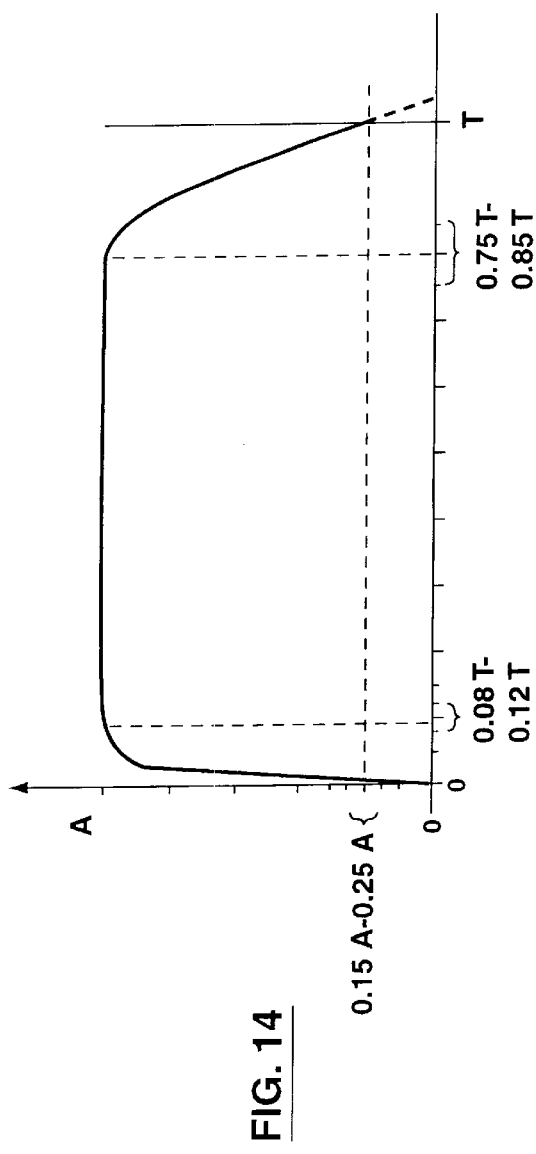
FIG. 14 shows in detail a typical commutation current waveform during phase conduction.

FIG. 14 shows in detail the commutation current waveform produced by the improvements introduced in the present invention. The commutation current waveform is defined by a commutation period T, and maximum amplitude A. (The commutation current waveform is substantially square when a start sequence is first initiated, due to the strong current passing through the phase windings and the lack of any counter e.m.f. forces. The waveform shown in FIG. 14 is therefore produced some time after the initial start once counter e.m.f. forces come into play.) The first of these improvements is what is believed to be a novel method of arranging the stator phase windings. Prior art devices typically use a six step, three phase winding (not shown). In the prior art devices, during operation, all three phases of the winding are used to generate magnetic flux, the windings being separated at approximately 120° from each other. As the rotor in the prior art six step, three phase winding system increases in speed, the flux from the rotor generates counter e.m.f. which will tend to shut down the current in the three phases. As all three phases are active, the counter e.m.f. forces generated will act on all three phases at the same time. As the current is going through all windings, this results in heated electronics and reduced capacity to generate flux. In the present invention, the phases are separated into twelve phase windings which conduct independently of each other. While it is possible to practise the teachings of this invention using six phase windings, having twelve phase windings is preferred because of the increased resolution that is provided. By having twelve phase windings, with two phase windings being active at one time, the duty cycle on the power module is effectively halved. This results in increased capacity to handle high current and reduces the effect of counter e.m.f. by approximately one half, as further explained below.

The twelve phases are wound through a stator housing comprising twenty-four stator slots and is wound in the patterns shown in FIGS. 7a and 8a. As shown, the phase windings P1 and P7 occupy the same stator slots. However, as shown in FIG. 13, P1 and P7 are not active at the same time. Rather, as illustrated in FIGS. 12a–12l and shown in the timing diagram in FIG. 13, two phase windings in two adjacent slots are active at one time. Referring back to FIG. 12a, a north pole of the rotor is shown at approximately the 12 o'clock position. As discussed previously, a south pole is created at approximately the 10 o'clock position as a result of phase windings P1 and P2 being active. As the rotor north pole begins to turn in the counter-clockwise direction towards phase windings P1 and P2, the rotor north pole generates counter e.m.f. forces which act on phase windings P1 and P2. However, due to the relative position of phase winding P2 with respect to phase winding P1, and the significantly reduced width of the rotor north pole face (described in detail above with reference to FIG. 5a) the counter e.m.f. forces acting on phase winding P2 are significantly less than the counter e.m.f. forces acting on phase winding P1. As a consequence, the current flowing in phase winding P2 is still very strong, which results in a strong south pole being produced at approximately the 10 o'clock position to continue to attract the rotor north pole at the 12 o'clock position and repel the rotor south pole at the 9 o'clock position. Thus, the rotor pole face of the current invention provides a narrowly focused flux field which allows the leading phase winding to continue to draw a strong current. At the same time, the opposing phase windings P7 and P8, which occupy the same stator slots as phase windings P1 and P2 respectively, are inactive as illustrated in FIG. 9a for P1 and P7. While the rotor north pole at 12 o'clock does act to impart counter e.m.f. forces on phase windings P7 and P8, since the phase windings P7 and P8 are at this instant in an open circuit, no current is allowed to flow through P7 and P8. Rather, the voltage at terminal B+, shown in FIG. 9a, becomes effectively double the voltage applied at terminal S+ shown in FIG. 9a, due to the counter e.m.f. effect on phase windings P7 and P8. At the same time, the effect of counter e.m.f. forces acting on the phase windings is effectively halved, resulting in a significant improvement over prior art devices in terms of the current which can flow through the active phase windings.

In conjunction with the significantly reduced counter e.m.f. in comparison to the prior art, the rotor assembly design of the present invention provides a significant increase in air space. This is accomplished by reducing the size of the rotor core hub 278', as shown in FIG. 5a, and by using steel plates 254 to contain the rotor windings within a confined space. The result is a rotor having a cross-section which is substantially square with shaped corners, as illustrated in FIG. 6. The increased air space resulting from this design allows the present invention to be operated over longer periods of time and at lower operating temperatures than the prior art devices using the rotor design as shown in FIGS. 4a and 4b.

While the six pole rotor variant will provide an air gap which is somewhat lesser than the air gap provided by the four pole rotor variant, the six pole rotor variant is still an improvement over the prior art design shown in FIG. 4a.

Referring back to FIG. 14, the rise time to maximum amplitude of the waveform shown is quite short because the counter e.m.f. forces generated by the advancing rotor pole face have not yet begun to affect the leading phase winding in a significant manner, allowing a large amount of current to continue to flow in the leading phase. As explained earlier, this is largely due to the design of the rotor pole face which is significantly reduced in width as compared to rotor pole faces found in the prior art, resulting in a narrowly focused magnetic flux field at the rotor pole faces. Typically, the rise time to maximum amplitude has been found to be between 0.08 T and 0.12 T, where T is the commutation period.

Referring back to FIG. 12a, after the short rise time to maximum current amplitude A, the current remains steady. Then, as the rotor north pole, originally at the 12 o'clock position, advances forward and passes under phase winding P1, the current in phase winding P1 is forced down, as shown in FIG. 14. While it is desirable to have a sustained current flow within the phase windings in order to create a strong flux field, if a significant amount of current is allowed to flow through the phase winding during shut-off, the effect can be detrimental. In the preferred embodiment, the current in the phase winding is brought down once the current waveform has continued in duration for approximately 75 to 85 percent of the on-cycle T (i.e. 0.75 T to 0.85 T). The current waveform is then reduced to approximately 15 to 25 percent of the maximum current amplitude A (i.e. 0.15 A to 0.25 A) at shut-off, as shown in FIG. 14. The point at which shut-down begins to occur, and the level of current which is flowing at shut-off, can be partially controlled by adjusting the relative position of the fan (with the optical interruptors) relative to the rotor poles.

In practice, the maximum current amplitude A will vary, depending upon the rotating speed of the rotor, and the power source being used. Furthermore, as the speed of the rotor increases, the counter e.m.f. forces generated by the rotor increases proportionately and will act to shut down the current passing through the phase windings. However, it has been observed that the general shape of the current waveform shown in FIG. 14 will remain substantially unchanged as rotational velocity increases.

It has been found that the improvements comprising a reduced width rotor pole face, opposite stator phase windings, and the arrangement of the phase windings within the stator housing provide approximately a 30 percent increase in torque over prior art designs. The result is a more powerful S/G. For example, where each phase is supplied with 500 amperes of current, the improved S/G of the present invention is capable of generating 12–20 hp, and delivering 45 lb-ft of starting torque, with significantly improved start efficiency of over 90%. The 500 amperes of current can be handled by using off-the-shelf solid state switching device drivers such as drivers p/n MC34152 manufactured by Motorola, and by using solid state switching device modules, such as switching device modules p/n IRF3205 manufactured by International Rectifier, which are each capable of handling 125 amperes. To handle 500 amperes, four of the switching device modules p/n IRF3205 can be arranged in parallel, and switched simultaneously by driver p/n MC34152.

Referring back to FIG. 14, the level of current flowing at the shut-off point can be controlled by the amount of current flowing through the rotor core windings, which affects the strength of the flux created at the rotor pole faces, thus affecting the counter e.m.f. forces generated within the active phase winding.

In order to fine-tune the current waveform as shown in FIG. 14, an optional and preferred step is to introduce secondary phase windings as illustrated in FIGS. 7b and 8b, and as shown in the circuit diagram in FIG. 9b. In order to improve the curve around the drop-off point in FIG. 14, a phase winding is wound in the next adjacent stator slot in the forward direction, every $(N+1)^{th}$ turn. In the preferred embodiment, every sixth turn of the phase winding is routed through the next adjacent stator slot in the forward direction to give a ratio of secondary phase windings to main phase windings of 1:5 as previously discussed. The secondary phase windings effectively prolong the level of current that can flow through the phase winding, due to the relative position of the secondary phase relative to the advancing rotor pole face. In effect, the secondary phase windings allow the current waveform to drop off at a later time while still being brought down to an acceptable level of around 20% of the maximum current at phase shut-off. While it has been found experimentally that a ratio of 1:5 is preferable, it is to be understood that other ratios of secondary phase windings to main phase windings are possible within the scope of this invention, namely, ratios between 1:3 and 1:7 can be used. Thus, N would be an integer between 3 and 7.

Figure 15:
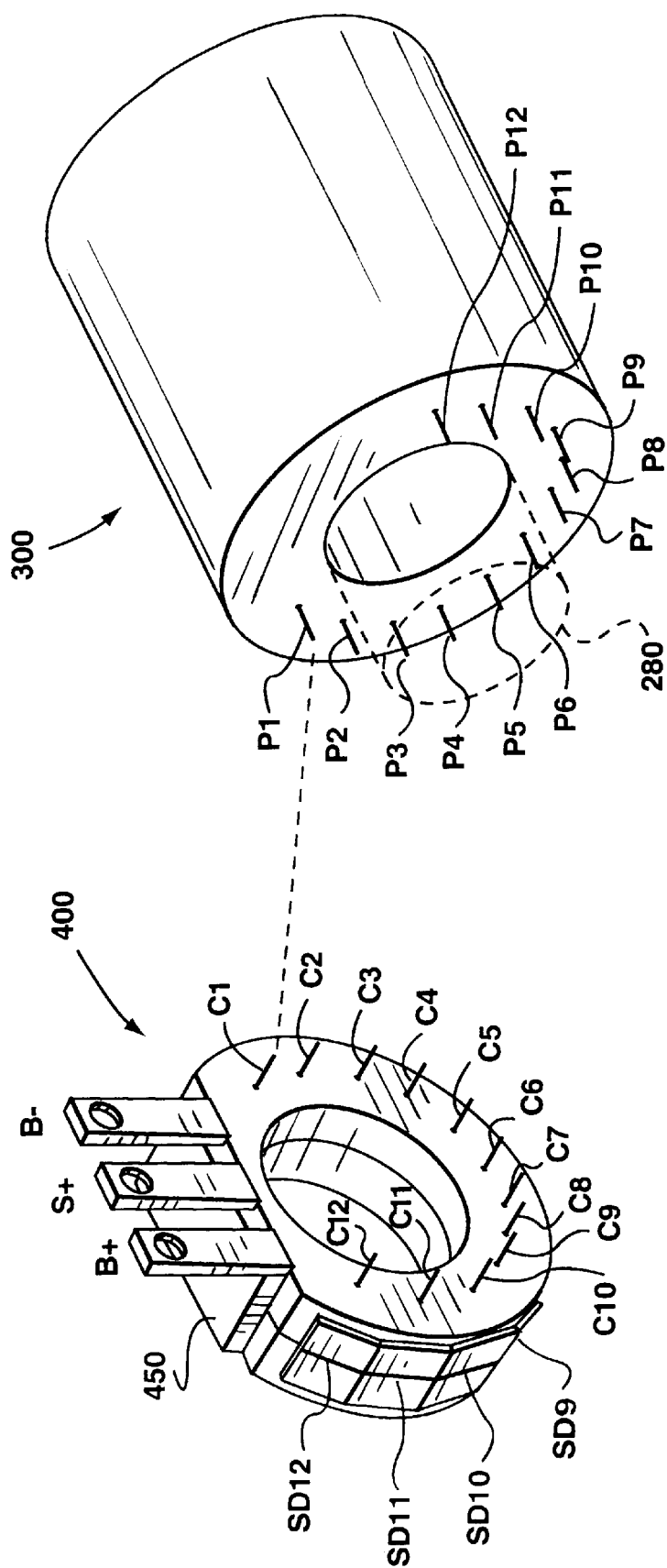
FIG. 15 shows a simplified orthogonal view of a preferred embodiment of a power module, as used in the present invention.
Figure 15A:
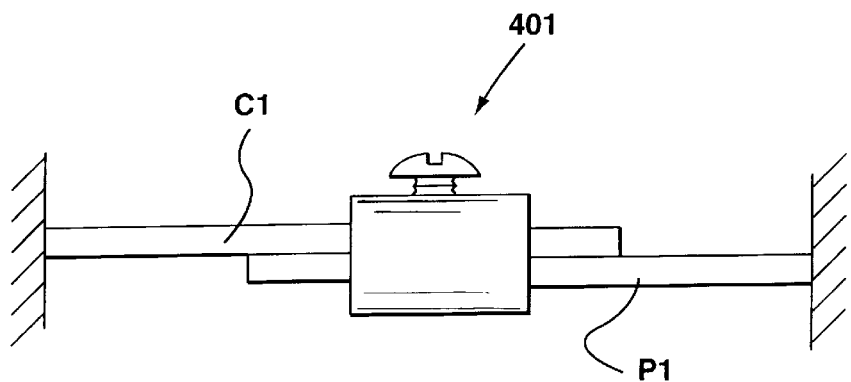

Another manner in which the present invention has been improved over the prior art is the introduction of a compact power module design. The compact power module design of the present invention is illustrated in a simplified isometric drawing at FIG. 15, and shows the circular ring arrangement which allows the power module assembly 400 to be installed directly adjacent to the stator housing 300, as illustrated in FIG. 2. The circular power module assembly shown in FIG. 15 is the physical embodiment of the circuit illustrated in FIG. 10. This compact power module design is made possible by the use of off-the-shelf compact solid state switching devices (SD1–SD12), such as the switches described earlier, which are capable of conducting a high current of 500 amperes when operating in parallel. Driving each solid state switching device is a solid state switching device driver, such as the driver described earlier, which is mounted on the commutation logic circuit board 450 forming part of the ring structure of the power module 400. Advantageously, the solid state switching device modules are arranged along a curve and connection leads C1–C12 from the solid state switching device modules are positioned to line up with the stator phase leads P1–P12 coming out from the stator assembly, thus minimizing the distance between the solid state switching device modules and each corresponding phase winding. The connection leads C1–C12 can be connected to stator phase leads P1–P12 respectively by a connector 401 as illustrated by way of example in FIG. 15a. The physical sequence of the solid state switching device modules corresponds to the commutation sequence as shown in FIG. 13, making the identification of the corresponding modules straight forward. In addition, by placing the power module 400 within the main housing, and in the downstream path of the fan 220, the power module 400 is air-cooled, allowing it to run at a lower operating temperature. In summary, a power module having a compact circular ring shape has been designed which substantially matches the shape of the stator assembly and which can fit within the main housing of the S/G. Using the solid state switching devices and drivers described earlier, the power module is capable of conducting as much as 1700 amperes. This design represents a significant improvement over the prior art in terms of compactness and current handling capacity. It will be understood that more solid state switching devices can be used in parallel to increase current handling capacity even further. Still referring to FIG. 15, the solid state switching devices are shown positioned along the outer surface of the compact circular ring shape. The outer surface of the compact circular ring shape provides ample room for the solid state switching devices. Also, this location, downstream from the cooling fan and within the front cover housing, allows the solid state switching devices to be effectively air-cooled.

As previously mentioned, the present invention is also capable of acting as an electric generator. Referring back to FIG. 10, in generator mode, the solid state switching devices SD1–SD12 are not used (i.e. switches S1–S12 remain open). Once the aircraft engine undergoes ignition and is rotating at a sustainable speed, the start current being supplied at terminal S+ (FIG. 10) is shut off. As will be understood by a person skilled in the art, as the rotor assembly rotates and the rotor pole faces pass under each pair of phase windings in turn (the excitation current in the rotor windings continuing to create a magnetic field at the rotor pole faces), current is induced in the stator phase windings and a voltage is created at the terminal blocks across terminals B+ and B–. Taking phase windings P1 and P7 as an example, and referring back to FIG. 9a, in generator mode both switches S1 and S7 remain open. It will be seen that both phase windings P1 and P7 are connected at S+ which is shut off in generator mode. Consequently, the phase windings P1 and P7 can be considered to be in series. Thus, one possible current path is from terminal B– through diode D7 through phase winding P7 through phase winding P1 through diode D1' and finally to terminal B+. Another possible current path is from terminal B– through diode D1 through phase winding P1 through phase winding P7 through diode D7' and finally to terminal B+. As a rotor pole face passes under the phase windings P1 and P7, the current induced in the phase windings, and alternately flowing through the above described paths, will produce the voltage across terminals B+ and B–.

Figure 16:
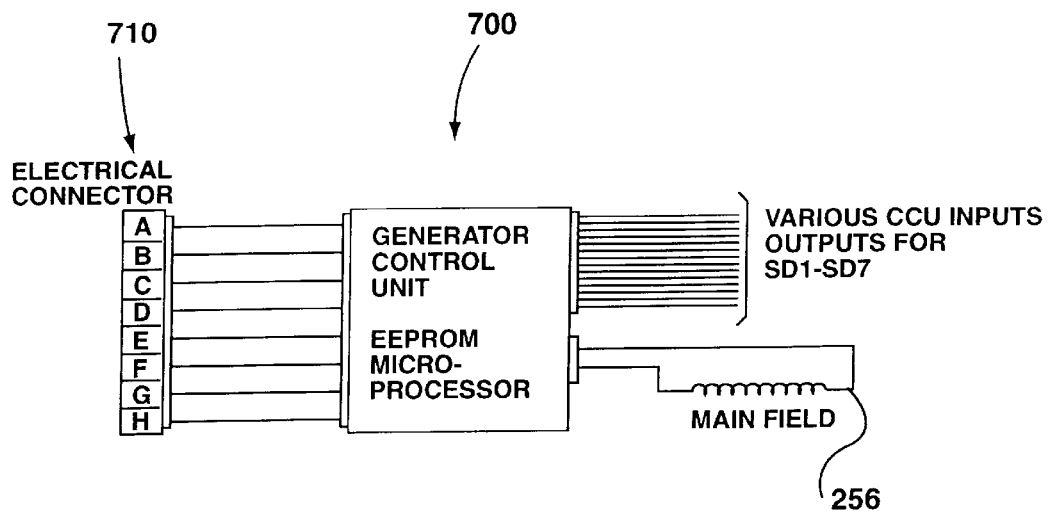
FIG. 16 schematically illustrates a S/G control unit.

Now referring to FIG. 16, a schematic diagram of an S/G control unit 700, including the commutation logic circuit board 450 of FIG. 15, is shown. The integrated micro processor control is capable of controlling numerous characteristics in the starter mode and in the generator mode. For example, in starter mode, the integrated micro processor is capable of starter field current control, automatic starter cut-off control, and over-voltage protection, among others. As shown, the S/G control unit 700 is capable of controlling the current passing through the main rotor field 256. Also, the S/G control unit 700 includes various outputs and inputs to and from the solid state switching device modules SD1–SD12. The starter-generator control unit 700 is also capable of communicating with various other aircraft systems through an electrical connector 710.

In generator mode, the integrated micro processor includes a voltage regulator, a current limiter, automatic paralleling control, generator line contactor control, under-speed protection, over-voltage protection, and over-excitation control, among others.

While a particular embodiment of the present invention has been illustrated and described, it would be obvious to those skilled in the art that various other changes and modifications can be made without departing from the spirit and scope of the invention. Specifically, it is possible to use a rotor having preferably four or six poles. However, two pole or even eight pole designs are possible. Furthermore, it is possible to vary the number of stator slots which are used in conjunction with the rotor variants, as described earlier. In addition, it is possible to alter the number of phases which are turned on at any one time. Through experimentation, it has been determined that, when using a twelve phase design, having two phases on at the same time provides the best results. Furthermore, it will be understood that the concept described in detail for the twelve phase system can be extended to a greater number of phases for even higher resolution. It should be noted that, during the initial start, more than two phase windings may be active for a very short duration until the current in the phase windings are reduced to an acceptable operating level by counter e.m.f. forces. Other possible variations will be obvious to those skilled in the art. It is therefore intended to cover in the claims all of such changes and modifications that are within the scope of this invention.

I claim:

1. A DC electric starter comprising:
   (i) a rotor assembly with a rotor core having a cross-sectional silhouette formed by a hub with F equally spaced apart appendages extending radially from said hub, each of said appendages comprising an arm attached to said hub and having an outer end and a flanged formation at said outer end of said arm, said flanged formation having a width contained within a sector defined by a first pair of straight lines extending from the center of the rotor assembly to each edge of said flanged formation, the angle formed by said first pair of straight lines defining a first angle between them, said first angle being between $30°\times(4/F)$ and $40°\times(4/F)$ wherein F is the number of rotor poles and the value of F is one of four and six; and
   (ii) a generally hollow cylindrically shaped stator assembly encircling said rotor assembly, said stator assembly having an inner surface and including a plurality of stator slots extending substantially lengthwise along said inner surface, each of said slots having at least two main stator phase winding segments located therein, said two main stator phase winding segments in each stator slot being oppositely wound:
   wherein, said stator assembly has a forward direction of rotation, and there are twelve main stator phase winding segments and 6×F stator slots, said twelve main phase winding segments being identifiable as main phase winding segments one through twelve, each of said main phase winding segments one through six being routed through six consecutive stator slots and in the same direction within said stator slots, each of said main phase winding segments one through six being further routed through every sixth stator slot at substantially $360°/F$ intervals from a corresponding one of said six adjacent stator slots, for a plurality of turns, each turn covering 360° in said forward direction, each of said main phase winding segments seven through twelve being routed through said six consecutive stator slots but in a direction within said stator slots opposite from main phase winding segments one through six, each of said main phase winding segments seven through twelve being further routed through every sixth stator slot at substantially $360°/F$ intervals from the corresponding one of said six consecutive stator slots, for said plurality of turns, each turn covering 360° in said forward direction, so as to form said two oppositely wound main phase winding segments in every stator slot.

2. The DC electric starter recited in claim 1, further comprising a commutating circuit for commutating only one of said main phase winding segments at a time.

3. The DC electric starter recited in claim 1, wherein every $(N+1)^{th}$ turn of each of said phase winding segments is offset by one stator slot position in said forward direction, so as to form a secondary phase winding segment corresponding to each of said main phase winding segments one through twelve, the turn ratio of said secondary phase winding segments to said main phase winding segments being 1:N, where N is an integer between 3 and 7.

4. The DC electric starter recited in claim 3, wherein said turn ratio of said secondary phase winding segments to said main phase winding segments is 1:5.

5. A DC electric starter according to claim 3 or 4, wherein, said DC electric starter also operates as a generator in generator mode.

* * * * *